(12) United States Patent
Allen et al.

(10) Patent No.: US 11,885,437 B2
(45) Date of Patent: Jan. 30, 2024

(54) STEM SEAL CARTRIDGE FOR VALVE

(71) Applicant: Mueller International, LLC, Atlanta, GA (US)

(72) Inventors: Sean Michael Allen, Chattanooga, TN (US); Paul S. Gifford, Chattanooga, TN (US); Alexander Michael Jenkins, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/719,467

(22) Filed: Apr. 13, 2022

(65) Prior Publication Data

US 2023/0332717 A1    Oct. 19, 2023

(51) Int. Cl.
    *F16K 41/04*    (2006.01)

(52) U.S. Cl.
    CPC .................................. *F16K 41/04* (2013.01)

(58) Field of Classification Search
    CPC ...................................................... F16K 41/04
    See application file for complete search history.

(56) References Cited

U.S. PATENT DOCUMENTS

| | | | | |
|---|---|---|---|---|
| 2,373,020 A | * | 4/1945 | Doster | F16K 41/02 137/315.28 |
| 3,583,416 A | * | 6/1971 | Nebesnik | F16K 3/314 251/291 |
| 4,294,427 A | * | 10/1981 | Cilny | F16K 3/10 251/86 |
| 4,605,031 A | * | 8/1986 | Grund | F16K 43/00 137/15.17 |

OTHER PUBLICATIONS

Dezurik; Brochure for DeZurik 3" (75MM) & Larger Eccentric Plug Valves, Jun. 2020, 8 pgs.
Henry Pratt Company; Drawings for 3"-12" Plug Valve, MJ Ends Gear Operated w/2" Nut, available before Apr. 13, 2021, 1 pg.
Image of Mueller Valve publicly disclosed before Apr. 13, 2021, 1 pg.
Youtube; Video and Transcript for "DeZurik Valve Replacing Training Video", available at <https://www.youtube.com/watch?app=desktop&v=iarMqpbT2Vk>, posted Jan. 21, 2016, 6 pgs.
Mueller; Brochure for Ballcentric Plug Valve, available before Apr. 13, 2021, Copyright 2018, 24 pgs.

\* cited by examiner

*Primary Examiner* — Kevin R Barss
(74) *Attorney, Agent, or Firm* — Taylor English Duma LLP

(57) ABSTRACT

A stem sealing device for a valve can include a device body defining an annular shape; a stem seal defining an annular shape and configured to seal a gap between a valve stem of the valve and a valve body of the valve and positioned within the device body, the stem sealing device installable in and removable from the valve as an assembly without prior or subsequent removal of the stem seal; and a fastener configured to secure the device body to the valve body.

44 Claims, 17 Drawing Sheets

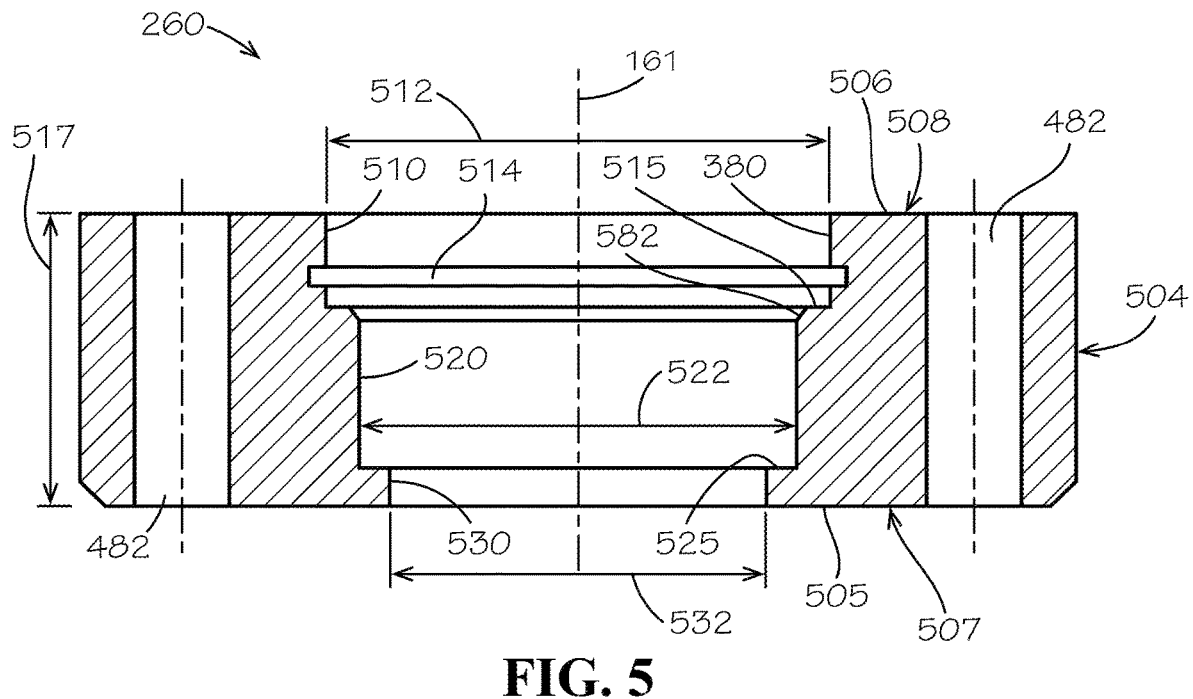
FIG. 5
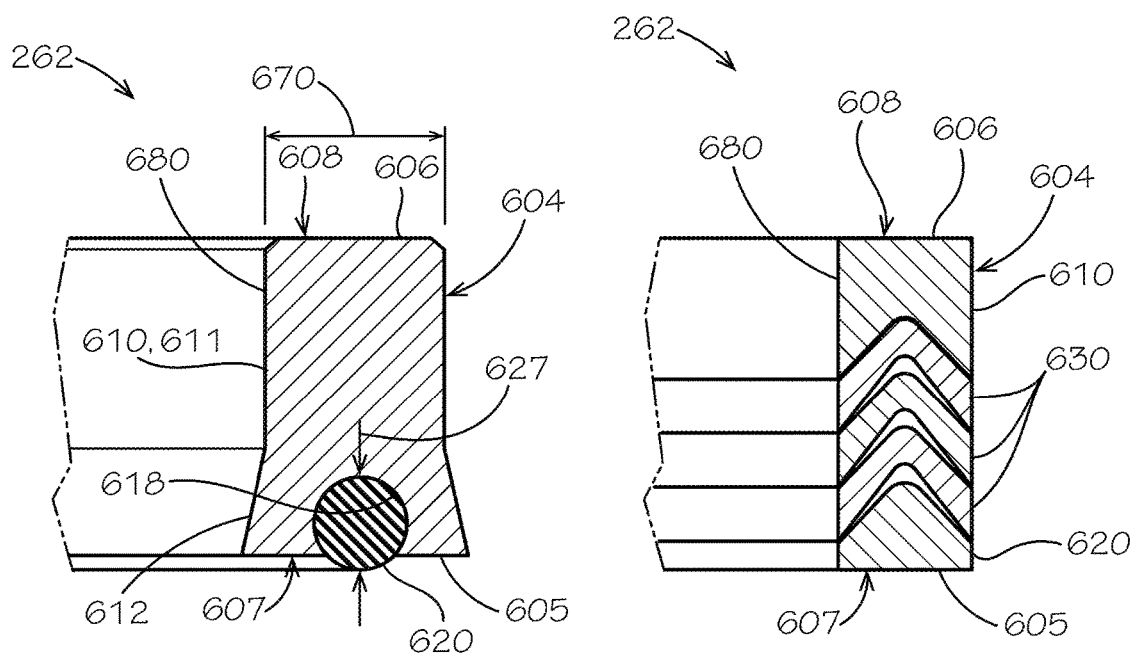
FIG. 6A  FIG. 6B

STEM SEAL CARTRIDGE FOR VALVE

TECHNICAL FIELD

Field of Use

This disclosure relates to valves used in fluid distribution systems. More specifically, this disclosure relates to valves with stem sealing in which a stem seal is configured to be removed and installed over a top end of the valve stem thereof.

Related Art

In plug valves and in similar valves involving sealing of a valve stem, the addition of an actuator can limit the ability of a user of the valve to conveniently adjust or replace a seal around the stem. With an actuator installed directly on top of the stem, access to the stem seal can be entirely lost or severely limited. By lifting the actuator, the stem seal may be accessible but not removable because common sealing methods rely on access over the top of the stem. As long as the actuator is attached, installation or removal over the top of the stem can be difficult or impossible without cutting the stem seal. Cutting the stem seal, which can create a leakage path past the stem seal, can be undesirable when the stem seal is configured to eliminate or close any such gaps between a valve body of the valve and the stem. Such cutting of the seal, encouraged in the industry by some as an unavoidable field repair step, creates a risk for leakage of the valve in the future, assuming the stem seal is properly installed and seals at all in the first place.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a valve comprising: a valve body; a valve member positioned inside the valve body and configured to selectively open and close the valve upon rotation of the valve member; a valve stem extending from the valve body, at least a portion of the valve stem coupled to the valve member, separable from the valve member, and movable with respect to the valve member during removal or installation to create a gap between the valve stem and the valve member; a stem sealing device secured to the valve body and encircling the valve stem, the stem sealing device defining an annular shape and configured to seal a gap between the valve stem and the valve body; and a valve riser secured to the valve body and defining an access opening, the access opening allowing access to the stem sealing device and replacement of the stem sealing device without displacement of the valve riser or an actuator secured thereto and without cutting of a seal stem of the stem sealing device, the actuator configured to rotate the valve member.

In a further aspect, disclosed is a stem sealing device for a valve, the stem sealing device comprising: a device body defining an annular shape; a stem seal defining an annular shape and configured to seal a gap between a valve stem of the valve and a valve body of the valve and positioned within the device body, the stem sealing device installable in and removable from the valve as an assembly without prior or subsequent removal of the stem seal; and a fastener configured to secure the device body to the valve body.

In yet another aspect, disclosed is a method of replacing a stem seal of a valve, the method comprising: removing at least a portion of a valve stem of the valve; and removing a stem sealing device of the valve; the stem sealing device comprising a device body defining an annular shape; a stem seal defining an annular shape and configured to seal a gap between a valve stem of the valve and a valve body of the valve and positioned within the device body, the stem sealing device installable in and removable from the valve without prior or subsequent removal of the stem seal; and a fastener securing the device body to the valve body.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 5 is a sectional view of a device body of the stem sealing device of the valve of FIG. 1 taken along line 5-5 of FIG. 4.

FIG. 6A is a detail sectional view of a stem seal of the stem sealing device of the valve of FIG. 1 taken along line 6-6 of FIG. 4.

FIG. 6B is a detail sectional view of the stem seal of FIG. 6A in accordance with another aspect of the current disclosure.

DETAILED DESCRIPTION

Figure 1:
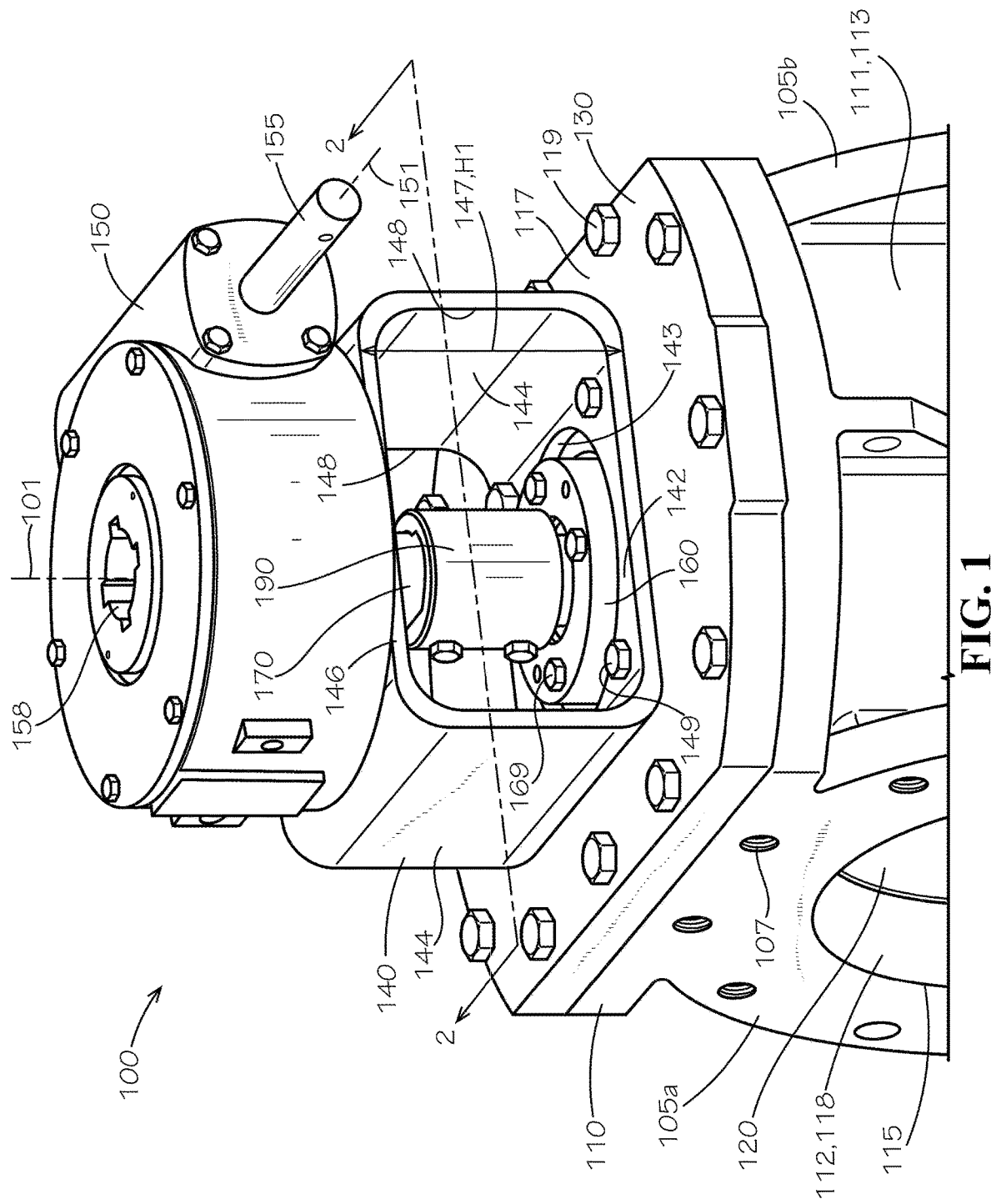
FIG. 1 is a perspective view of a top end of a valve, which is a plug valve, comprising a split-stem coupling in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

As used herein, unless the context clearly dictates otherwise, the term "monolithic" in the description of a component means that the component is formed as a singular component that constitutes a single material without joints or seams.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the valve nearest to an inlet of the valve; "rear" is that end of the valve that is opposite or distal the front; "left" is that which is to the left of or facing left from a person looking down a main through-axis of the valve from the front; and "right" is that which is to the right of or facing right from that same person. "Horizontal" or "horizontal orientation" describes that which is in a plane extending from left to right and aligned with the horizon. "Vertical" or "vertical orientation" describes that which is in a plane that is angled at 90 degrees to the horizontal.

In some aspects, a valve comprising a valve stem and associated methods, systems, devices, and various apparatuses are disclosed herein. In some aspects, the valve stem can comprise a split stem, which can comprise a first portion and a second portion separable from the first portion, or the valve stem can otherwise be separable from a valve member of the valve. In some aspects, the valve stem can comprise a stem coupling, which can join the first portion and the second portion.

FIG. 1 is a perspective view of a top end of a valve 100 in accordance with one aspect of the current disclosure. In some aspects, as shown, the valve 100 can comprise a valve body 110 and a valve member 120 (shown more fully in FIG. 2). In some aspects, the valve 100 can be a plug valve such as, for example and without limitation, the BALLCENTRIC® plug valve manufactured by Henry Pratt Company, LLC, of Aurora, Illinois. As such, the valve member 120 can be a plug. In other aspects, the valve 100 can be one of various other types of valves such as, for example and without limitation, another type of valve requiring stem sealing, whether vacuum or standard sealing service is involved, such as a cone valve, a butterfly valve, or a gate valve. A fluid distribution system comprising the valve 100 can comprise any one or more of a number of different fluid media or fluids including a gas such as air or a liquid such as water. The fluid can be flammable, non-flammable, explosive, or non-explosive. The valve 100 and, more specifically, the valve body 110, can further comprise a cap 130. The valve 100 can further comprise one or more of a valve riser or riser 140, an actuator 150, a stem sealing device 160, a stem or valve stem 170, and a stem coupling 190.

The valve member 120 of the valve 100 can be configured to rotate between a fully closed position shown and a fully open position. In some aspects, the valve member 120 can be configured to rotate a quarter of a turn or 90 degrees between the fully closed position and the fully open position. Including when the valve 100 is a typical plug valve, a portion of the valve member 120 can be configured to remain in the path of the fluid traveling through the valve 100 even when the valve 100 is open. In other aspects, the type of valve, the rotation angle or rotation angle range, or the particular valve configuration can differ from that described herein and shown in the figures.

The valve body 110 can define an inlet 115, an outlet 116 (shown in FIG. 2) distal from the inlet 115, a top end 117, a bottom end (not shown) distal from the top end 117, an interior cavity 118 defined between the inlet 115 and the outlet 116 and defining a fluid bore, and a shaft bore 228 (shown in FIG. 2) defined in the top end 117 and the bottom end. In some aspects, the interior cavity 118 and the shaft bore 228 can be cylindrical in shape. In some aspects, as shown, the cap 130 of the valve body 110 and, more generally, the valve 100 can define one or more features of the valve 100 and can be secured to a remaining portion or main portion 113 of the valve body 110. More specifically, the cap 130 can be removably secured to the main portion 113 of the valve body 110 with one or more fasteners 119. Each of the fasteners 119 can comprise any fastener element appropriate for securely connecting two components under pressure such as, for example and without limitation, a bolt and/or a nut, each of which can be threaded. Proximate to the top end 117 of the valve 100, a joint between the cap 130 and the main portion 113 of the valve body 110 can be sealed with a seal 239 (shown in FIG. 2), which can be or can comprise an O-ring.

The valve body 110 can further define a fluid bore axis or main axis (not shown) extending from the inlet 115 to the outlet 116 through the fluid bore. In some aspects, as shown, the valve body 110 can be a "flanged" type valve body comprising an attachment flange 105a,b on each axial end of the valve 100—relative to the main axis and proximate to the inlet 115 and the outlet 116—for attaching the valve to a piping system. Each of the attachment flanges 105a,b can respectively define a plurality of attachment holes 107 through which a plurality of fasteners, including but not limited to nuts and bolts, can secure the valve 100 to the piping system. In other aspects, the valve body 110 can be constructed as, for example and without limitation, a "lugged" type, a "wafer" type, or a "butt-weld" type valve. A lugged type valve typically comprises multiple lugs through which a plurality of fasteners can secure the valve 100 to the piping system, and a wafer type valve typically comprises neither lugs nor attachment flanges but is sandwiched between opposing flanges on the adjacent piping components of the piping system in which it is installed. A butt-weld type valve typically does not require fasteners for assembly to the piping system but is instead welded in place.

The valve body 110 can further comprise an outer surface 111 and an inner surface 112, which can define the interior cavity 118. The valve 100 can comprise a liner (not shown), which can line the interior cavity 118 of the valve body 110 and can extend from the inlet 115 to the outlet 116. The valve 100 can comprise a seat 215 (shown in FIG. 2) against which the valve member 120 can seal. The seat 215 can be disposed proximate to a one of the inlet 115 and the outlet 116. The seat 215 can define a seat surface (shown in FIG. 2).

The riser 140 can be secured to the valve body 110 and, more specifically, the cap 130. More specifically, the riser 140 can be secured to the valve body 110 with one or more fasteners 149. The riser 140 can comprise a base panel or base or first end 142. The riser 140 can comprise one or more side panels or side supports or sides 144. The riser 140 can comprise a top panel or top or second end 146. The riser 140 can raise the actuator 150 above the top end 117 of the valve body 110. More specifically, the riser 140 can support the actuator 150 at an offset distance 147 from the top end 117 of the valve body 110. In some aspects, as shown, a height H1 of the riser 140 can equal the offset distance 147. The riser 140 can define one or more access openings 148. Any one or more of the access openings 148 can allow access to the stem sealing device 160 and, optionally, the stem coupling 190 of the valve 100. More specifically, the access openings 148 and, more generally, the valve 100 can be configured to allow replacement of the stem sealing device 160 without displacement of the riser 140 or the actuator 150 and without cutting or disassembly of any portion of the stem sealing device 160.

In some aspects, as shown, the riser 140 can define a constant shape in cross-section except for any openings or seams defined therein. For example and without limitation, the riser 140 can be cut from a length of rectangular tubing. A base opening or first opening 143 can be defined in the first end 142 and can be sized to receive at least the stem sealing device 160 and the valve stem 170. A top opening or second opening 243 (shown in FIG. 2) can be defined in the second end 146 and can be sized to receive at least the valve stem 170. In some aspects, each of the first opening 143 and the second opening 243 can be circular in shape.

The actuator 150 can be configured to rotate, i.e., rotatably move, the valve member 120 about an axis 101 of the valve 100. For example, an operator-driven handwheel 1410 (shown in FIG. 14) or a motor or any other source of mechanical power attached to a shaft 155 of the actuator 150 can cause a portion of the actuator 150 in direct or indirect contact with the valve member 120 to rotate or rotatably move the valve member 120. Where, for simplicity, hatching in the figures shows some or all of an interior portion of the actuator 150 as being a single material, the actuator 150 can comprise any combination of a variety of parts, some moving and some non-moving, to transfer energy supplied by the energy source, e.g., the operator or the motor, to the valve member 120. As shown, an actuator axis 151 can be angled with respect to the axis 101 of the valve 100. The actuator 150 can define a bore 158 in which the valve stem can be configured to rotate.

The stem sealing device 160 can be secured to the valve body 110 and can be sized to sealably receive the valve stem 170. The stem sealing device 160 can be configured to seal a gap between the valve stem 170 and the valve body 110 or a portion thereof. The stem sealing device 160 can define an annular shape. The stem sealing device 160 can be secured to the valve body 110 with one or more fasteners 169. As shown, the stem sealing device 160 can be recessed within the first opening 143 defined in the riser 140. Such a recessed position of the stem sealing device 160 can increase space for and access to the stem coupling 190 and/or the valve stem 170.

Figure 2:
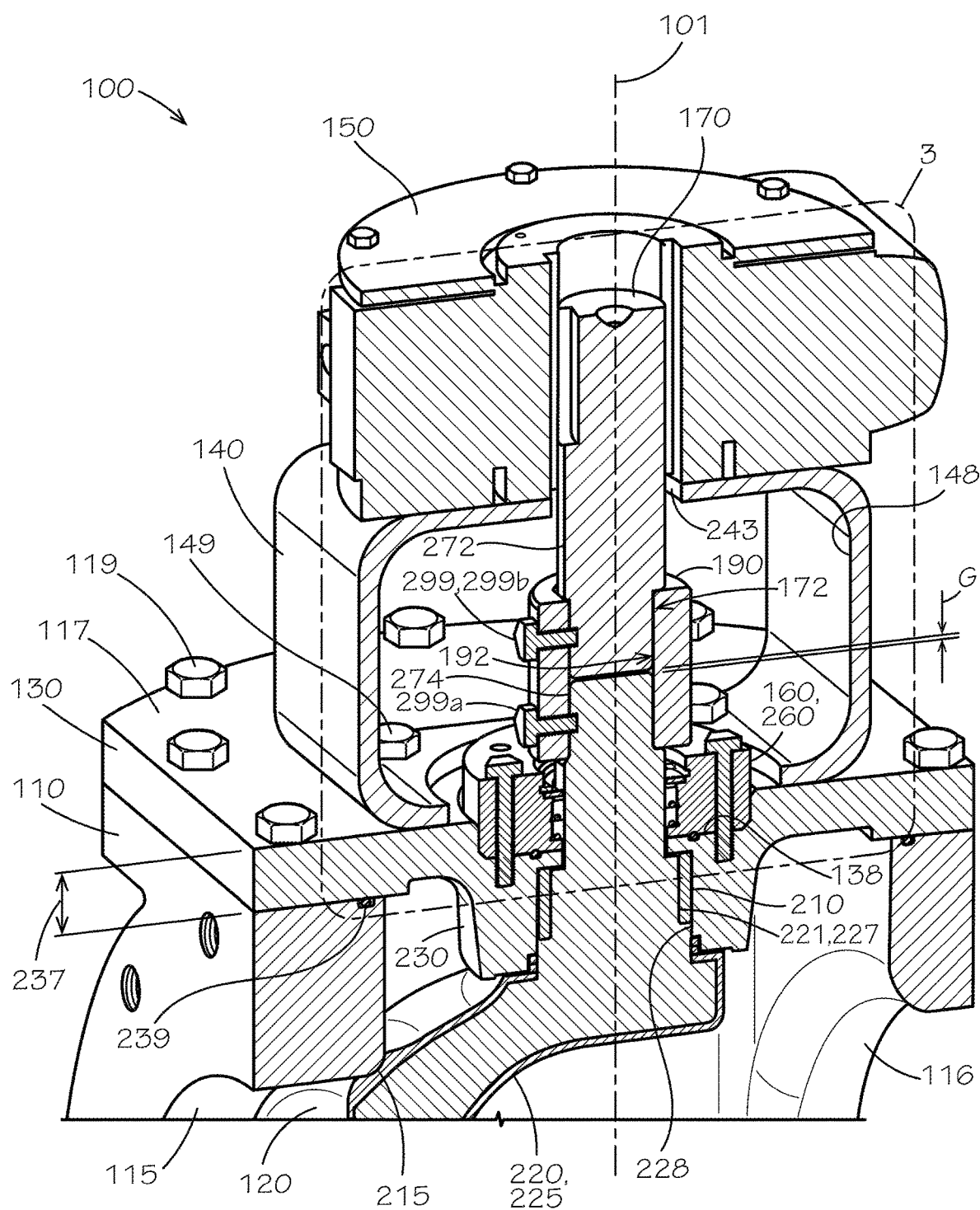
FIG. 2 is a sectional perspective view of the valve of FIG. 1 taken along line 2-2 of FIG. 1.

FIG. 2 is a sectional perspective view of the valve 100 of FIG. 1 taken along line 2-2 of FIG. 1. The valve member 120 can be positioned inside the valve body 110 and can be configured to selectively open and close the valve 100 upon rotation. The valve stem 170 can extend from the valve member 120 and from the valve body and can be coupled to the valve member 120. The valve stem 170 can be, at least in part, separable from the valve member 120 and movable with respect to the valve member 120 during removal or installation. Such separation and/or movement of the valve stem 170 can create a gap G between the valve stem 170 and the valve member 120 or between portions of the valve stem 170 during removal or installation. In some aspects, the gap G can exist in the valve when fully assembled to account for tolerances or for other reasons. In some aspects, as shown, the valve stem 170 can comprise a split stem. More specifically, the valve stem 170 can comprise an upper stem, first stem portion, or first portion 272; and a lower stem, plug stem, second stem portion, or second portion 274 separable or separate from the first portion 272. The second portion 274 can be proximate to the valve member 120 and can be coupled to the valve member 120 or formed monolithically with the valve member 120. The first portion 272 can be distal from the valve member 120 and can be coupled to the second portion 274. A connection between the first portion 272 and the second portion 274 can be positioned axially between the stem sealing device 160 and the valve member 120 with respect to the axis 101 of the valve stem 170.

The first portion 272 and the second portion 274 can be coupled to each other with the stem coupling 190. The stem coupling 190 can be joined to each of the first portion 272 and the second portion 274 with one or more fasteners 299. More specifically, a first fastener 299a can join the stem coupling 190 to the second portion 274, and a second fastener 299b can join the stem coupling 190 to the first portion 272. In some aspects, as shown, the fastener 299 or the fasteners 299a,b can extend through a wall of the stem coupling 190 and can be received partly within but not extend completely through the valve stem 170. In some aspects, the fastener 299 or the fasteners 299a,b can be set screws, and they need not extend into the valve stem 170 at all. In some aspects, one or both of the valve stem 170 and the stem coupling 190 can define an anti-rotation element 172. For example and without limitation, a one of the valve stem 170 and the stem coupling 190 can define a flattened surface, which can be the anti-rotation element 172 and another of the valve stem 170 and the stem coupling 190 can define a flattened mating surface, which can be a mating element 192. For example and without limitation, each of the anti-rotation element 172 and the mating element 192 can be a flat machined on one or more portions of an axial end of the valve stem 170 or the portions 272,274 thereof. In cross-section, the valve stem 170 or the portions 272,274 can thereby define a shape with one or more straight edges (e.g., a D-shape, a polygonal shape, or any combination of curved and/or straight segments). The anti-rotation element 172 and the mating element 192 can engage each other and can prevent rotation of the valve stem 170 with respect to the stem coupling 190 and vice versa. In some aspects, the anti-rotation element 172 can comprise geometry that protrudes from the valve stem 170 or any geometry that matches the mating element 192 of the stem coupling 190 and cannot rotate inside the stem coupling 190. In some aspects, as shown, the anti-rotation element 172 can be defined on an outer surface of the valve stem 170 or otherwise visible from the outside. In some aspects, the anti-rotation element 172 can at least in part define or be defined in an inner surface of the valve stem 170. For example, the anti-rotation element 172 can comprise a polygonal-shaped or other non-circular cavity or cavities defined in an axial end surface of either or both of the first portion 272 and the second portion 274. The stem coupling 190 can define an annular shape. The first portion 272 and the second portion 274 of the valve 100 need not be joined with the stem coupling 190 where the first portion 272 and the second portion 274 are otherwise fixed to each other or where an angular position of the second portion 274 is otherwise fixed with respect to the first portion 272, or vice versa.

As shown, a thickness 237 of the cap 130 can vary from an edge of the cap 130 towards a portion of the cap proximate to the axis 101 of the valve. More specifically, the cap 130 can define a central portion, which can define a boss as shown and can define the shaft bore 228 therein. In some aspects, the shaft bore 228 can comprise a first portion defined in the top end 117 of the valve body 110 and a second portion (not shown) defined in the bottom end of the valve body 110. The valve body 110 and, more specifically, the cap 130 or the central portion 230 can accommodate a bearing surface 221 of the valve member 120 and/or a sleeve bearing 210. More specifically, the sleeve bearing 210 and/or the bearing surface 221 can be received within the central portion 230 of the valve body 110. The valve body 110 and, more specifically, the cap 130 or the central portion 230 can receive at least a portion of the valve stem 170. In some aspects, as shown, the valve body 110 can receive the second portion 274 of the valve stem 170. By varying the thickness 237, the cap 130 can in a single monolithic part fulfill or facilitate any one or more of a variety of purposes (e.g., sealing of the valve body at the top end 117, providing a bearing surface for the rotating stem 170 and the valve member 120, receiving the stem sealing device 160, and/or supporting the riser 140).

The stem sealing device 160 can comprise a device body 260. The stem sealing device 160 can comprise one or more seals and one or more fastening elements, any or all of which can be received within the device body 260. Components of the valve 100 and, more specifically, the stem sealing device 160 such as, for example and without limitation, the device body 260 can be machined (e.g., for improved manufacturability and tighter tolerances) and assembled separately. The same can be said of other components disclosed herein and able to formed from a machinable material. The stem sealing device 160 can be a self-contained and pre-assembled unit or cartridge able to be removed from or assembled to the valve 100 in one piece during servicing. The valve body 110 and, more specifically, the cap 130 or the central portion 230 can receive the stem sealing device 160. More specifically, the device body 260 can be positioned within a bore or cavity or recess 138 defined in the top end 117 end of the valve body 110.

The valve member 120 can comprise a web 220. In some aspects, the valve member 120 can comprise a plug stem or bearing shaft 227, about which the web 220 and, more generally, the valve member 120 can be configured to rotate during opening and closing of the valve 100. The bearing shaft 227 of the valve member 120 can comprise an upper portion and a lower portion (not shown), which can extend from the web 220 at a lower end of the valve member 120 and can likewise facilitate rotation of the valve member during opening and closing of the valve 100. The shaft bore 228 of the valve body 110 and the valve stem 170 can be aligned along the axis 101 during assembly of the valve 100. The valve member 120 can comprise a shell or coating 225, which can enclose the valve member and, more specifically, the web 220.

Figure 3:
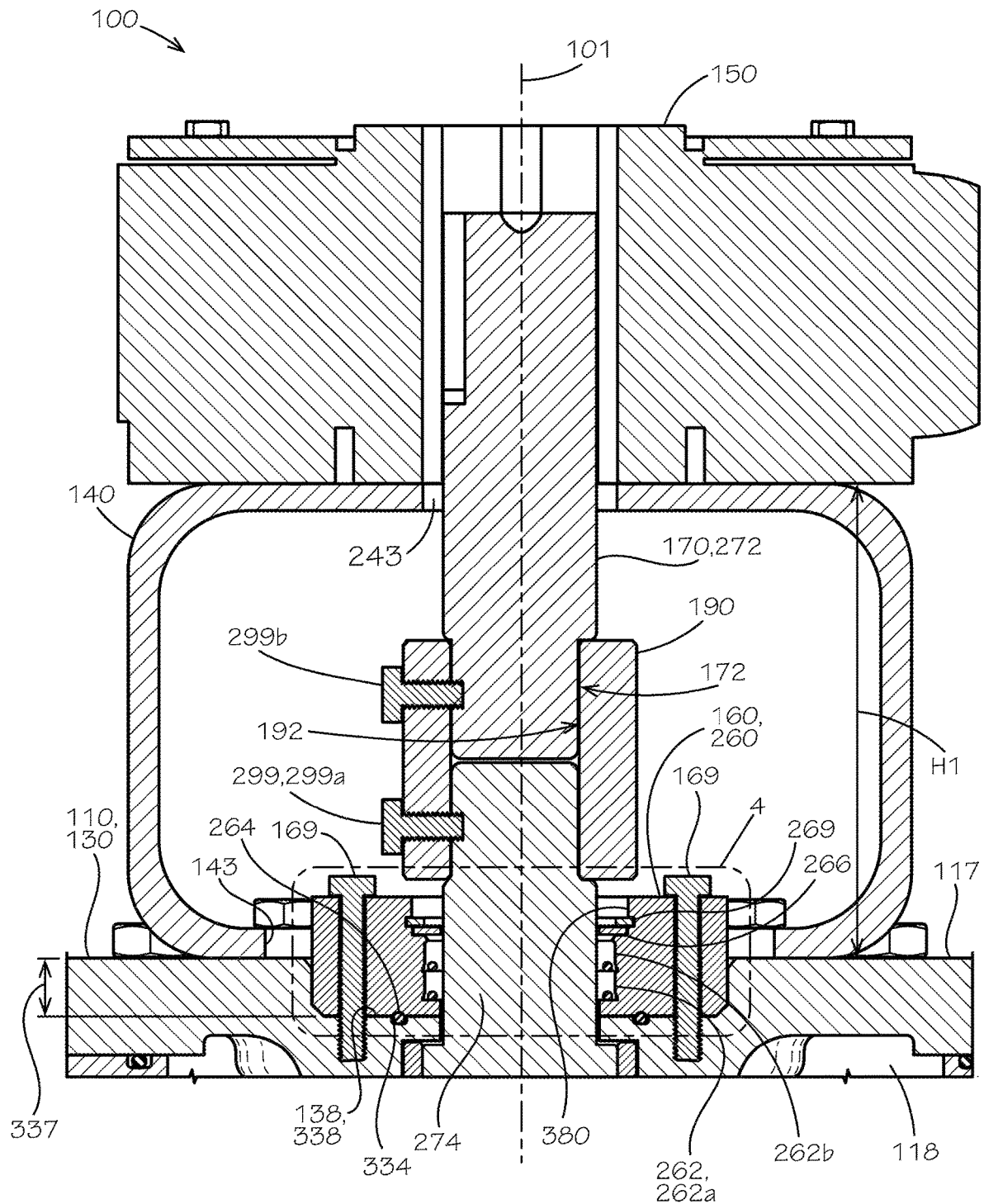
FIG. 3 is a detail sectional view of the valve of FIG. 1 taken from detail 3 of FIG. 2.

FIG. 3 is a detail sectional view of the valve 100 of FIG. 1 taken from detail 3 of FIG. 2. The stem sealing device 160 can comprise one or more stem seals 262. As shown, the stem sealing device 160 can comprise a pair of stem seals 262a,b. The stem sealing device 160 can comprise one or more body seals 264. As shown, the stem sealing device 160 can comprise a single body seal 264.

The stem sealing device 160 can comprise one or more fastening elements, which can be configured to maintain a position of same. In some aspects, as shown, the stem sealing device 160 can comprise a washer 266, which can help maintain an axial position of the stem seal 262 or the stem seals 262a,b. In some aspects, the stem sealing device 160 can comprise a retaining ring or retainer 269, which can help maintain an axial position of the washer 266 and can be removable with snap ring pliers (not shown). An inner diameter of the washer 266 can be less than an outer diameter of the stem seals 262a,b and less than an inner diameter 512 (shown in FIG. 5) of the device body 260. Meanwhile, an inner diameter of the retainer 269 can be less than an outer diameter of the washer 266, and an outer diameter of the retainer 269 can be greater than an outer diameter of the washer 266. The inner diameter of each of the washer 266 and the retainer 269 can be greater than the valve stem 170 to allow the valve stem 170 to be received therethrough. The stem seal 262 or the stem seals 262a,b can be supported on at least one axial end by a shoulder 525 (shown in FIG. 5) defined in the device body 260. The washer 266 can be supported on at least one axial end by a shoulder 515 (shown in FIG. 5) defined in the device body 260. The retainer 269 can be received within and supported by on at least one axial end by a groove 514 (shown in FIG. 5) defined in the device body 260.

The stem seal 262 or the stem seals 262a,b can be configured to seal a gap or space defined between a valve stem 170 of the valve 100 and the valve body 110 of the valve 100 and can be positioned within a recess or cavity or bore 380 defined in the device body 260. The stem sealing device 160 can be installable in and removable from the valve 100 as an assembly without prior or subsequent removal of the stem seal 262 or the stem seals 262a,b by the one installing or removing the stem sealing device 160. In some aspects, the stem sealing device 160 can be installable in and removable from the valve 100 as an assembly without prior or subsequent removal of the one or more body seals 264. Described in further detail in connection with FIG. 6A, the one or more stem seals 262 can comprise a U-cup packing. The body seal 264 can be configured to seal a gap or space or seam between the device body 260 and the valve body 110. The body seal 264 can be compressible under loads experienced during assembly.

Again, the stem sealing device 160 and, more specifically, the device body 260 can be recessed below a surface of the top end 117 of the valve body 110. More specifically, a bottom surface 338 of the recess 138 can be offset or, more specifically, recessed by an offset height or recess height 337. The body seal 264 can be positioned between an axial end surface of the device body 260 and an axial end surface of the valve body 110. More specifically, the body seal 264 can be received within a groove 334 defined in one of the valve body 110 and the device body 260. As shown, the groove 334 can be defined in the valve body 110.

In some aspects, the height H1 of the riser 140 can be great enough that, even when the self-contained stem sealing device 160 is not present or not recessed within the valve body 110 as shown and/or the stem sealing components present between the valve body 110 and the valve stem 170 are removable only as individual parts, such components can still be removed without removing the actuator 50 or cutting the sealing components. In such aspects, the first portion 272 of the valve stem 170 as well as the stem coupling 190, if used, can be removed through the one or more access openings 148. If the valve 100 does not originally include the riser 140, the riser 140 can be installed between the valve body and the actuator 150 later. Furthermore, the second portion 274 of the stem and, as desired, the stem coupling 190 can be installed on such a valve to facilitate later removal and installation of stem sealing components without cutting of same.

Figure 4:
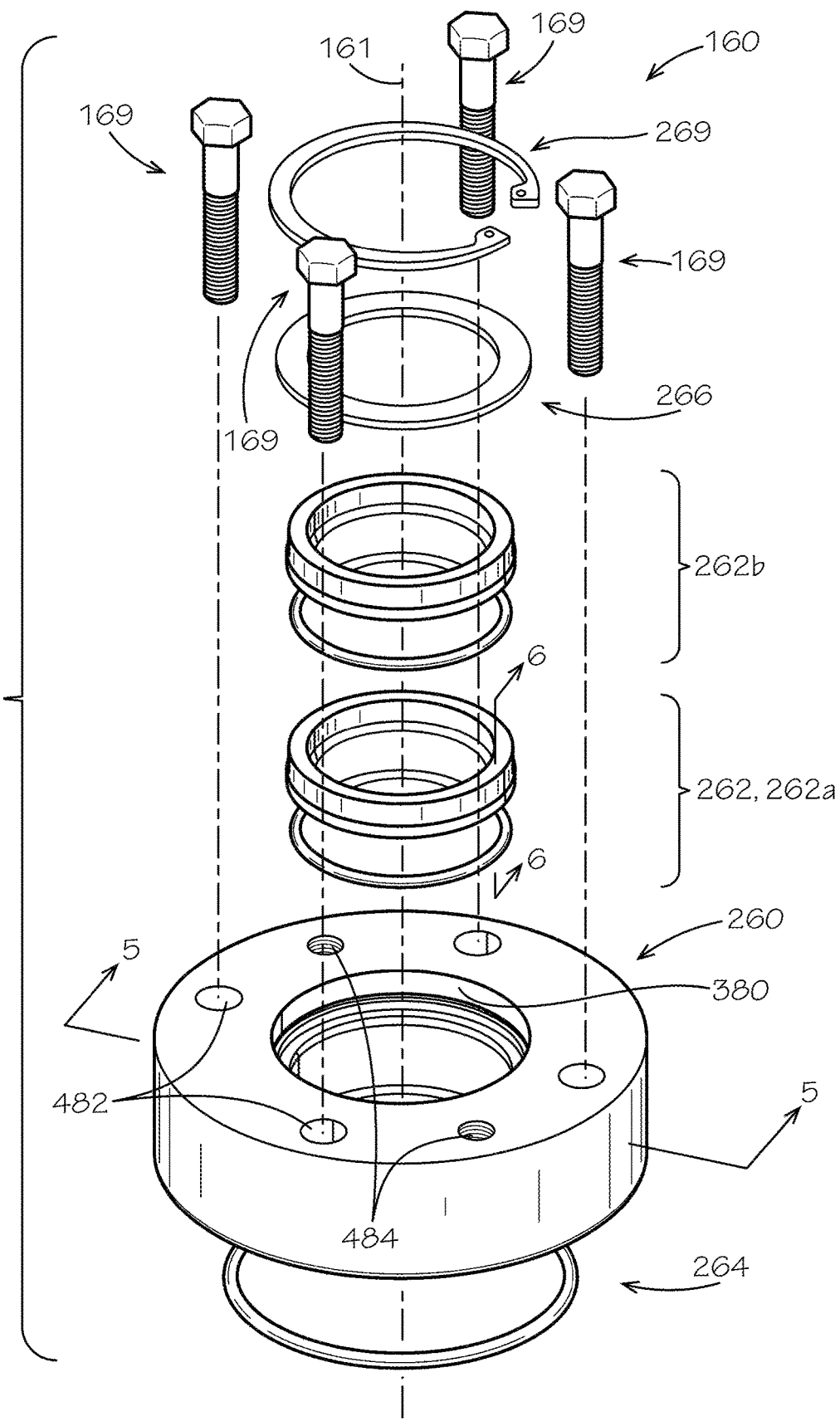
FIG. 4 is exploded perspective view of a stem sealing device of the valve of FIG. 1

FIG. 4 is exploded perspective view of the stem sealing device 160 of the valve 100 of FIG. 1 taken from detail 4 of FIG. 3. Any one or more of the device body 260, the stem seals 262a,b, the body seal 264, and the washer 266 can define an annular shape. In some aspects, the retainer 269 can define a gap between two circumferential ends thereof. More specifically, the retainer 269 can be or can comprise a retaining ring. Each of the washer 266 and the retainer 269 can be formed from a rigid material configured to resist deformation under operational loads. Any one or more of the components of the stem sealing device 160 can define an axis and can be aligned with a device axis or axis 161 upon assembly. The fasteners 169 can comprise any combination of fastener elements including a bolt, a bolt and a nut, or a stud (for example, extending from the valve body 110) and a nut. For example and without limitation, in some aspects comprising a single instance of the fastener 169, one side of the device body 260 can be held in place by engagement of the device body 260 itself (e.g., with a lip or tab or other protrusion or recess thereof) with a mating feature on the valve body 110, and another side of device body 260 can be secured with the single fastener 169. The device body 260 can define one or more openings 482, which can receive the fasteners 169. The device body 260 can define one or more openings 484, which can receive other fasteners such as, for example and without limitation, one or more fasteners 1390 (shown in FIG. 13B) securing a gland 1310 (shown in FIG. 13B). As shown, the device body 260 can define at least four openings 482 and at least two openings 484. In some aspects, the stem sealing device 160 need not include the body seal 264, which can be part of a remaining portion of the valve 100.

FIG. 5 is a sectional view of a device body 260 of the stem sealing device 160 (shown in FIG. 4) of the valve 100 of FIG. 1 taken along line 5-5 of FIG. 4. The device body 260 can define a first axial end 505 defining a first axial end surface 507 and a second axial end 506 defining a second axial end surface 508. The device body 260 can define an axial length or height 517. The device body 260 can define an outer surface 504, which can be a radially outer surface and, more specifically, a radially outermost surface. The bore 380 can comprise a first portion 510 defining an inner diameter 512. The bore 380 can comprise a second portion 520 defining an inner diameter 522, which can be less than the inner diameter 512. The bore 380 can comprise a third portion 530 defining an inner diameter 532, which can be less than each of the inner diameter 512 and the inner diameter 522. The largest of the diameters 512,522,532 can be a major diameter or major inner diameter of the device body 260, and the smallest of the diameters 512,522,532 can be a minor diameter or minor inner diameter of the device body 260.

The device body 260 can further define the shoulder 515 between the first portion 510 and the second portion 520. The device body 260 can further define the shoulder 525 between the second portion 520 and the third portion 530. Each of the shoulders 515,525 can be an axially facing surface of the bore 380. As shown the shoulders 515,525 can face away from the first axial end surface 507 and towards the second axial end surface 508. Each of the shoulders 515,525 can be angled with respect to the bore 380 and, more specifically, the respective portions 510,520,530 thereof. More specifically, each of the shoulders 515,525 can be angled at 90 degrees with respect to one or more of the portions 510,520,530 of the bore 380.

Again, one or both of the shoulders 515,525 can support one or more other components of the stem sealing device 160. In some aspects, the shoulder 515 can support the washer 266 (shown in FIG. 4) and, more specifically, an axial end thereof. In some aspects, the shoulder 525 can support the stem seal 262 (shown in FIG. 4) or the stem seals 262a,b (shown in FIG. 4) and, more specifically, an axial end thereof. Any one of the portions 510,520,530 of the bore 380 can define protruding or recessed features therein. In some aspects, as shown, the first portion 510 can define a groove 514 defining a diameter, which can be greater than the inner diameter 512 of the first portion 510. One or more of the shoulders 515,525 or other surfaces or edges of the bore 380 can define an edge treatment 582, which can be a chamfer as shown or can be a radius.

The first portion 510 can be sized and configured to receive one or more of the components of the stem sealing device 160 such as, for example and without limitation, the washer 266 and the retainer 269 (shown in FIG. 4). More specifically, the groove 514 can be sized and otherwise configured to receive the retainer 269. The second portion 520 can be sized and configured to receive one or more of the components of the stem sealing device 160 such as, for example and without limitation, the stem seals 262 or the stem seals 262a,b. The bore 380 and, more specifically, the third portion 530 can be sized and configured to receive the valve stem 170 (shown in FIG. 3). As shown, the device body 260 can be monolithic.

FIG. 6A is a detail sectional view of the stem seal 262 of the stem sealing device 160 (shown in FIG. 4) of the valve 100 of FIG. 1 taken along line 6-6 of FIG. 4. As shown, one or more of the stem seals 262 (or, similarly with respect to this and other features, the stem seals 262a,b) can be or can comprise a U-cup packing. The stem seal 262 can define a first axial end 605 defining a first axial end surface 607, a second axial end 606 defining a second axial end surface 608, a bore 680, and a radially outer surface 604. More specifically, as shown, the stem seal 262 can comprise a main body or first body 610, which can define a top portion or first portion 611 and a bottom portion or second portion 612 and can define a U-shape. The bore 680 at the first portion 611 of the stem seal 262 can define a cylindrical surface. The radially outer surface 604 of the first portion 611 of the stem seal 262 can define a cylindrical surface. The first portion 611 can define a radial width 670, which in some aspects, as shown in FIG. 6B, can also be the radial width 670 of the entire stem seal 262. In some aspects, as shown in FIG. 6A, a radial width of the stem seal 262 at the first axial end 605 can be greater than the radial width 670 at the second axial end 606. The bore 680 of the second portion 612 of the stem seal 262 can define a conical surface, which can be angled in cross-section with respect to the radially outer surface 604 at the first portion 611. The radially outer surface 604 of the second portion 612 of the stem seal 262 can be angled in cross-section with respect to the radially outer surface 604 at the second portion 612. As shown, each of the bore 680 and the radially outer surface 604 can simultaneously define a conical surface are thereby the second portion 612 can define a flared or dovetail shape in cross-section.

The stem seal 262 can comprise a secondary body or second body 620. In some aspects, as shown, the second body 620 can comprise an O-ring. The second body 620 can define a circular shape in cross-section, which can define a diameter 627. The second body 620 can be received within a groove or recess 618 defined in the first body 610 and, more specifically, the first axial end 605 and the second portion 612 of the first body 610. In some aspects, as shown, the recess 618 can be just large enough for the second body 620. In some aspects, the recess can extend further into the first body 610 towards the second axial end 606 thereof, and in such aspects the "U" shape of the first body 610 can be more pronounced. As shown, a portion of the second body 620 can protrude in an axial direction outwards past a first axial end of the first body 610 or, more specifically, a portion of the first axial end 605 defined by the first body 610.

FIG. 6B is a detail sectional view of the stem seal 262 of FIG. 6A in accordance with another aspect of the current disclosure. As shown, one or more of the stem seals 262 (or, similarly with respect to this and other features, the stem seals 262a,b) can be or can comprise a Chevron or V-type packing. The stem seal 262 can, as described above, define the first axial end 605 defining the first axial end surface 607, the second axial end 606 defining the second axial end surface 608, the bore 680, and the radially outer surface 604. In some aspects, as shown, the first body 610 can be a female adapter, the second body 620 can be a male adapter, and the stem seal 262 can comprise one or more third bodies 630 therebetween, each of which can be a V ring. Each third body 630 can comprise a pair of legs angled with respect to each other and with respect to the axes 101,161 and can be configured to receive or be received within the first body 610 and the second body 620. Again, the bore 680 can define a cylindrical surface, and the radially outer surface 604 can define a cylindrical surface. As shown, an entirety of each of the bore 680 and the radially outer surface 604 can define a cylindrical surface.

In some aspects, the stem seal 262 can comprise any configuration including the U-cup and V-type packing configurations disclosed herein. In some aspects, different configurations of the stem seal 262 comprising different configurations of the stem seal 262 can be exchanged or swapped out in the field or built into the valve 100 upon original assembly of the valve 100 without requiring a change to or replacement of any other components. Different configurations of the stem seal 262 can be suited for particular uses based on the fluid being stored and/or transported by the system in which the valve 100 is located, where the valve 100 is installed, how the valve is maintained, and/or other factors.

Figure 7:
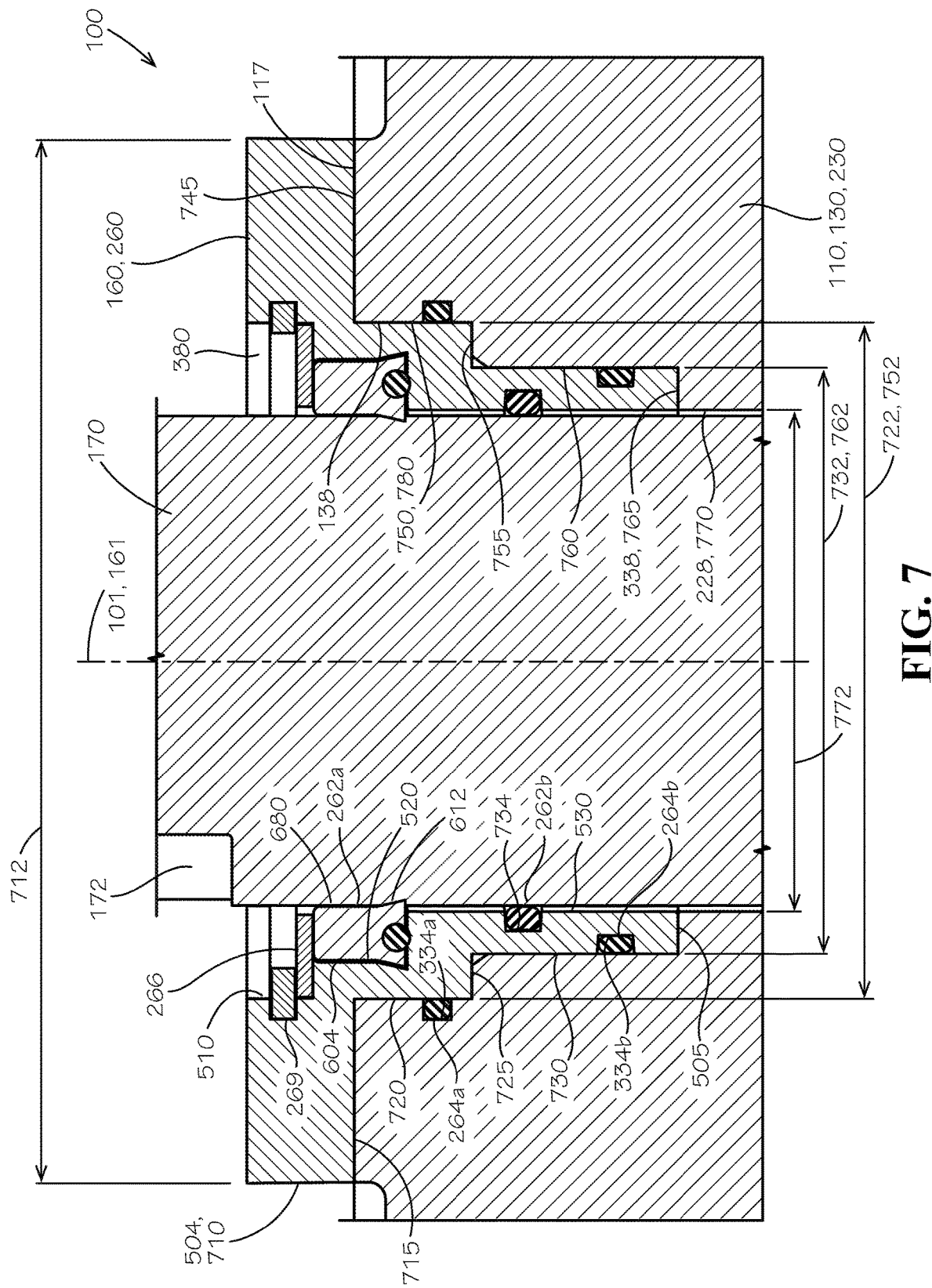
FIG. 7 is a sectional view of a stem sealing device of the valve of FIG. 1 taken from an area of the valve shown in detail 4 of FIG. 3 in accordance with another aspect of the current disclosure.

FIG. 7 is a sectional view of the stem sealing device 160 of the valve 100 of FIG. 1 taken from an area of the valve 100 shown in detail 4 of FIG. 3 in accordance with another aspect of the current disclosure. The device body 260 can comprise the portions 510,520,530 of the bore 380, and the stem seal 262a can be received within the second portion 520. While the stem seal 262a is shown in an undeformed shape as shown in FIG. 6A, in some aspects the second portion 612 of the stem seal 262a can be compressed or squeezed into a space defined between the second portion 520 and the valve stem 170. More specifically, both the bore 680 and the outer surface 604 of the stem seal 262a can define only cylindrical surfaces upon assembly with the stem sealing device 160 and the valve stem 170.

In some aspects, the outer surface 504 of the device body 260 can comprise multiple portions, which can step down in diameter with respect to each other. For example, the outer surface 504 can comprise a first portion 710 defining an outer diameter 712. The outer surface 504 can comprise a second portion 720 defining an outer diameter 722, which can be less than the outer diameter 712. The outer surface 504 can comprise a third portion 730 defining an outer diameter 732, which can be less than each of the outer diameter 712 and the outer diameter 722. The largest of the diameters 712,722,732 can be a major diameter or major outer diameter of the device body 260, and the smallest of the diameters 712,722,732 can be a minor diameter or minor outer diameter of the device body 260. The valve body 110 can define a shoulder 715 between the first portion 710 and the second portion 720. The valve body 110 can define a shoulder 725 between the second portion 720 and the third portion 730. Each of the shoulders 715,725 can be angled with respect to the outer surface 504 and, more specifically, one or more of the portions 710,720,730 thereof. More specifically, each of the shoulders 715,725 can be angled at 90 degrees with respect to one or more of the portions 710,720,730 of the outer surface 504.

Meanwhile, the valve body 110 can comprise multiple portions, which can step down in diameter with respect to each other. For example, a bore 780 in the valve body 110 defining the recess 138 can comprise a first portion 750 defining an outer diameter 752. The bore 780 can comprise a second portion 760 defining an outer diameter 762, which can be less than the outer diameter 752. The bore 780 can comprise a third portion 770 defining an outer diameter 772, which can be less than each of the outer diameter 752 and the outer diameter 762. The largest of the diameters 752, 762,772 can be a major diameter or major inner diameter of the cap 130 of the valve body 110, and the smallest of the diameters 752,762,772 can be a minor diameter or minor inner diameter of the cap 130 of the valve body 110. The valve body 110 can define a shoulder 745, which can intersect the first portion 750 distal from the second portion 760 and can define the top end 117 of the valve body 110. The valve body 110 can define a shoulder 755 between the first portion 750 and the second portion 760. The valve body 110 can define a shoulder 765 between the second portion 760 and the third portion 770. Each of the shoulders 745, 755,765 can be angled with respect to the bore 780 and, more specifically, one or more of the portions 750,760,770 thereof.

A second stem seal 262b, which can comprise only an O-ring, can be received within the third portion 530 and, more specifically, within a groove 734 defined in the third portion 530. More specifically, the stem seal 262b can comprise only an O-ring as the main body 610 thereof and without the U-cup packing or any portion of the V-type packing. Such a stem seal 262b, i.e., the O-ring, can be used in a space that would not be large enough to receive the the stem seal 262a when comprising the U-cup or V-type packing configuration. "Seal" or "packing" can thus be used in a broad sense to describe any flexible or deformable mechanical structure configured to prevent leakage of a fluid past the seal or packing. Upon assembly, the second stem seal 262b can define an oval shape but in an undeformed condition can define a circular shape.

Body seals 264a,b can seal between the valve body 110 and the device body 260. More specifically, the body seal 264a can seal between the second portion 720 and the recess 138 of the valve body 110, and the body seal 264b can seal between the third portion 730 and the recess 138 of the valve body 110. In some aspects, the body seals 264a,b can be received within grooves 334a,b, each of which can again be defined in one of the valve body 110 and the device body 260. As shown, the groove 334a can be defined in the valve body 110 and, more specifically, the first portion 750 of the bore 780 thereof. Also as shown, the groove 334b can be defined in the device body 260 and, more specifically, the third portion 730 of the outer surface 504 thereof.

A thickness in a radial direction of the device body 260, especially at the second portions 520,720 and the third portions 530,730, can minimize the amount of space needed between the valve body 110 and the valve stem 170 for the stem sealing device 160. The axial height 517 (shown in FIG. 5) of the device body 260, an especially a portion of the axial height 517 at the first portions 510,710, can likewise minimize the amount of space needed between the valve body 110 and the stem coupling 190 (shown in FIG. 1) for the stem sealing device 160. In some aspects, the stem coupling 190 can, in an axial direction with respect to the axis 101, push against or contact the device body 260 and thereby hold the device body 260 and, more generally, the stem sealing device 160 in place against the valve body 110 of the valve 100. In some aspects, the axial height 517 of the device body 260 or an axial height of any portion thereof can measure, for example and without limitation, 2 inches or less. The axial height 517 can vary depending on a type and size of the valve 100.

Figure 8:
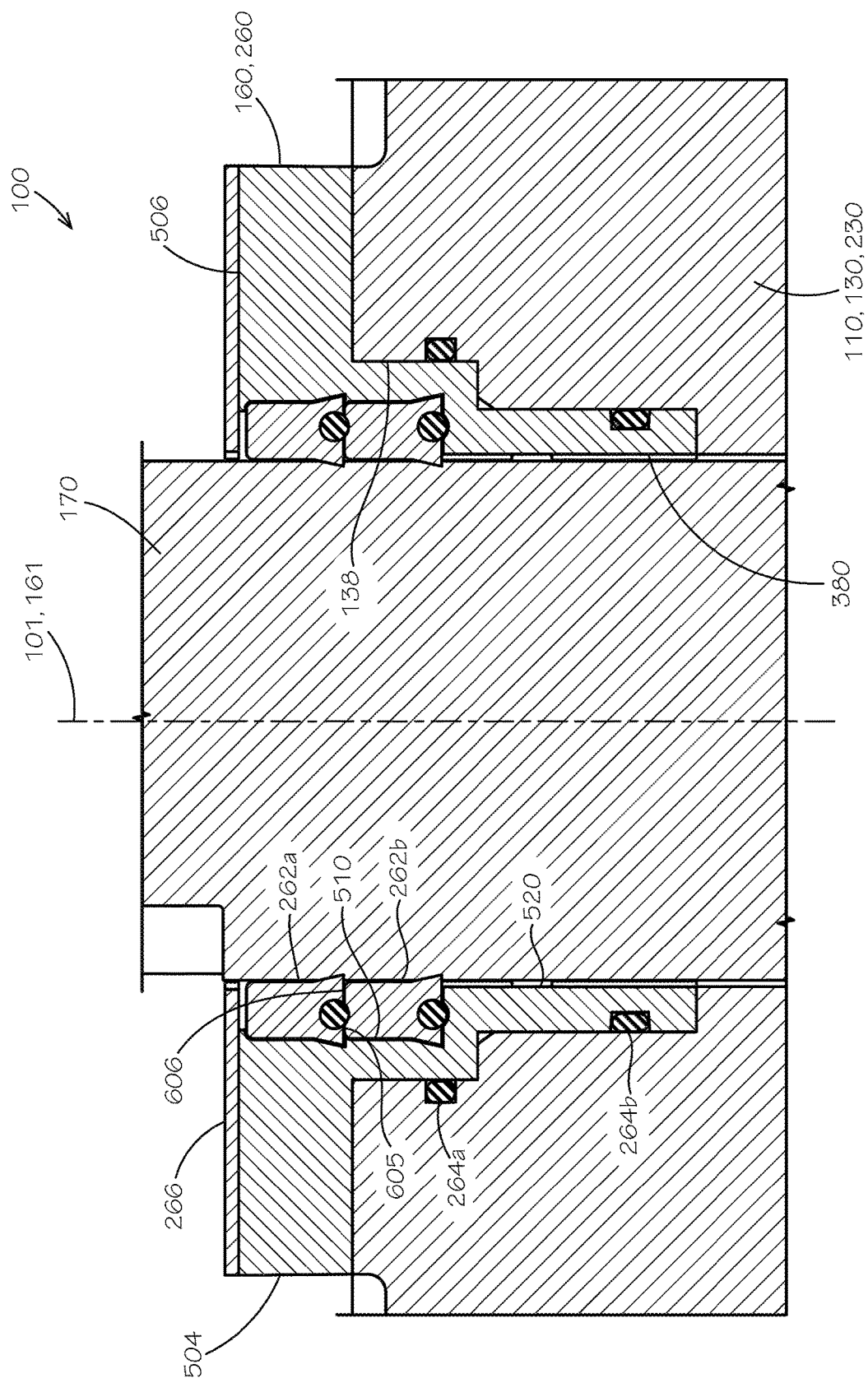
FIG. 8 is a sectional view of a stem sealing device of the valve of FIG. 1 taken from an area of the valve shown in detail 4 of FIG. 3 in accordance with another aspect of the current disclosure.

FIG. 8 is a sectional view of the stem sealing device 160 of the valve 100 of FIG. 1 taken from an area of the valve 100 shown in detail 4 of FIG. 3 in accordance with another aspect of the current disclosure. As shown, the stem sealing device 160 can comprise a pair of the stem seals 262a,b. Each stem seal 262a,b of the pair of the stem seals 262a,b can be the aforementioned U-cup or V-type packing. The stem seals 262a,b can be positioned adjacent to each other in an axial direction with respect to the axis 101 and can contact each other. More specifically, the first axial end 605 of the stem seal 262a can contact the second axial end 606 of the stem seal 262b. As shown, the stem seal 262b shown in FIG. 7 and comprising only the O-ring need not be incorporated into the stem sealing device 160. In some aspects, the stem sealing device 160 can comprise a single instance of the seal stem 262, which can have dimensions or proportions differently than shown.

The washer 266 can again maintain a position of the stem seals 262a,b but need not be received within the bore 380 of the device body 260. More specifically, the washer 266 can face and can contact the second axial end 506 of the device body 260. Again, the inner diameter of the washer 266 can be less than an outer diameter of the stem seals 262a,b and less than an inner diameter 512 (shown in FIG. 5) of the device body 260. The washer 266, which can be a plate, can be fastened to the device body 260 with the one or more fasteners 169 (shown in FIG. 4) or with separate fasteners and/or can be retained in position with the stem coupling 190. The washer 266 can be formed from or can comprise a rigid material. More specifically, the washer 266 can be formed from or can comprise a metal such as, for example and without limitation, stainless steel, or a plastic such as, for example and without limitation, ultra-high-molecular weight polyethylene (UHMVV). Again, the stem coupling 190 can push against or contact the device body 260 and thereby hold the device body 260 and, more generally, the stem sealing device 160 in place against the valve body 110 of the valve 100.

Figure 9:
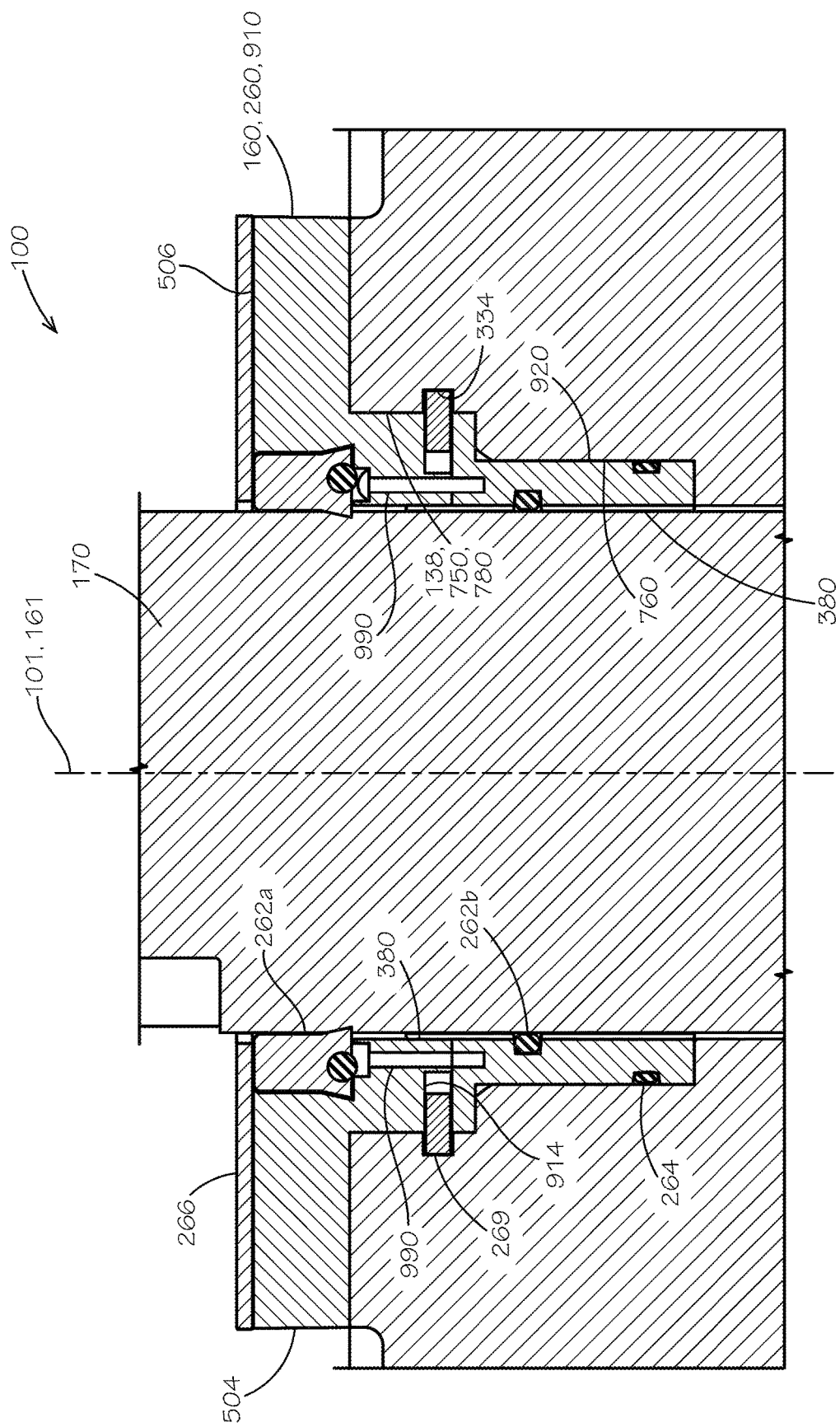
FIG. 9 is a sectional view of a stem sealing device of the valve of FIG. 1 taken from an area of the valve shown in detail 4 of FIG. 3 in accordance with another aspect of the current disclosure.

FIG. 9 is a sectional view of the stem sealing device 160 of the valve 100 of FIG. 1 taken from an area of the valve 100 shown in detail 4 of FIG. 3 in accordance with another aspect of the current disclosure. In some aspects, as shown, the device body 260 can comprise a top portion or first body portion 910 and a bottom portion or second body portion 920, in which case the second body portion 920 can be separable from the first body portion 910. In some aspects, the first body portion 910 can comprise the stem seal 262a, and the second body portion 920 can comprise the stem seal 262b. Due to space and, more specifically, height constraints in an axial direction with respect to the axis 101, only the stem seal 262a can comprise the one of the U-box and V-type packings in some aspects. Meanwhile, due to space and, more specifically, height constraints in a radial direction with respect to the axis 101, the stem seal 262b can comprise only the O-ring and not the one of the U-box and V-type packings in some aspects.

In some aspects, the second body portion 920 can be assembled to the first body portion 910 with one or more fasteners 990. As shown, the second body portion 920 can be assembled to the first body portion 910 with a plurality of the fasteners 990, which can be arranged about the axis 161 in a circular pattern when the device body is viewed facing the second axial end 506 along the axis 161. In some aspects, the second body portion 920 can be assembled to the first body portion 910 with a threaded connection. More specifically, one of the first body portion 910 and the second body portion 920 can define threads in an axial end thereof, and another of the one of the first body portion 910 and the second body portion 920 can define mating threads in an axial end thereof. For example and without limitation, a portion of the bore 380 defined in the first body portion 910 can define female threads, and a portion of the second body portion 920 can defining male threads (not shown) configured to engage the female threads (not shown) of the first body portion 910.

In some aspects, as shown, the retainer 269 can be positioned in a groove 334 defined in the recess 138 of the valve body 110. In some aspects, the retainer 269 can be positioned in a groove 914 defined in the first body portion 910. The retainer 269 can be configured to retain a position of the second body portion 920 in an axial direction with respect to the axes 101,161. The retainer 269 can be configured to be assembled to the valve body 110 after assembly of the second body portion 920 with the valve body 110 but before assembly of the first body portion 910 with the valve body 110. In some aspects, the retainer 269 can maintain a position of the second portion 920 with respect to the valve body 110. More specifically, as shown, the retainer 269 can be received with a groove 334 defined in the device body 260.

As shown, each of the first body portion 910 and the second body portion 920 of the device body 260 can be monolithic. More specifically, being monolithic, the first body portion 910 and the second body portion 920 can be configured to be assembled separately to the valve body 110 and, more generally, a remaining portion of the valve 100. The device body 260 of each of FIGS. 7-9 can be manufacturable on a lathe. In some aspects, for example those involving the bolt-together design in FIG. 9, a secondary machining set-up can be used to fabricate at least a portion of the device body 260 by forming holes in each of the first body portion 910 and the second body portion 920 for receipt of the fasteners 990.

In some aspects, the axial height 517 (shown in FIG. 5) of the device body 260 or any portion thereof can be minimized. In some aspects, for example, the axial height 517 of the device body 260 can be 2 inches or less, including for other embodiments. In some aspects, the axial height 517 of either or both of the first body portion 910 and the second body portion 920 of the device body 260 can be one half inch or less. In some aspects, the riser 140 is not required to be installed, at least during operation of the valve 100, between the actuator 150 and the valve body 110 and the actuator 150 can be configured to be lifted from the valve body 260 enough to allow passage of the device body 260 between. In some aspects, the second body portion 920 can accommodate work on an "energized" or pressurized pipeline without de-energizing the pipeline. More specifically, the second body portion 920 can be a primary seal, and the first body portion 910 can be a backup or secondary seal. The first body portion 910 can be removed and/or replaced without disturbing a position or other configuration of the second body portion 920. In some cases, the device body 260 can comprise the lower seal 920 but not the upper seal 910.

Figure 10:
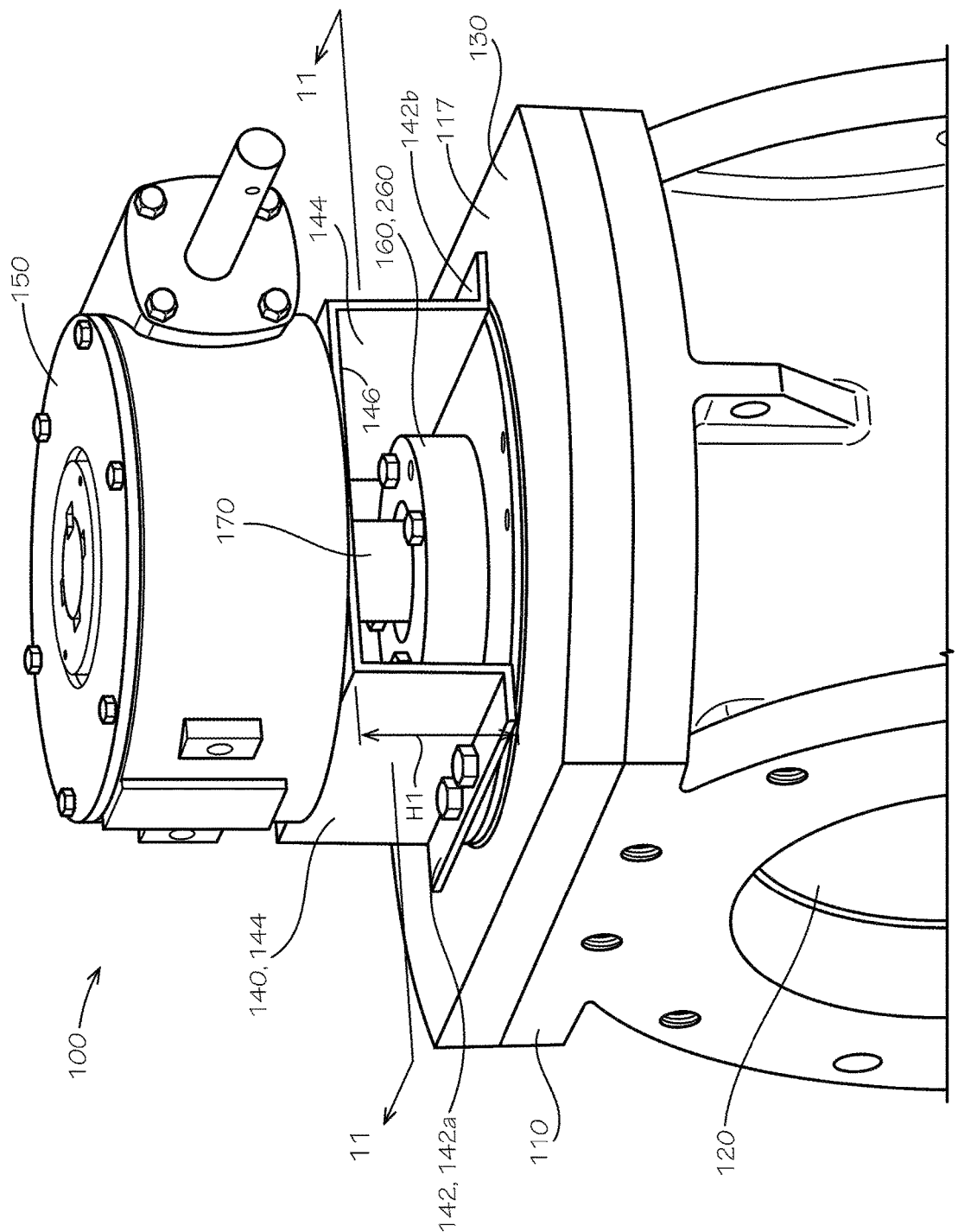
FIG. 10 is a perspective view of a top end of a valve comprising a split stem but not requiring a stem coupling in accordance with another aspect of the current disclosure.

FIG. 10 is a perspective view of the top end of the valve 100 comprising a split stem 170 in accordance with another aspect of the current disclosure. As shown, the valve 100 need not require the stem coupling 190 (shown in FIG. 1) and can, for at least this reason, define a shorter height on the riser in comparison to use of the stem coupling 190. In some aspects, as shown, the riser 140 can be formed from a blank. As shown, the first end 142 of the riser 140 can comprise flanges 142a,b, which can extend outward from the sides 144 and can be configured to secure the riser 144 to the valve body 110.

Figure 11:
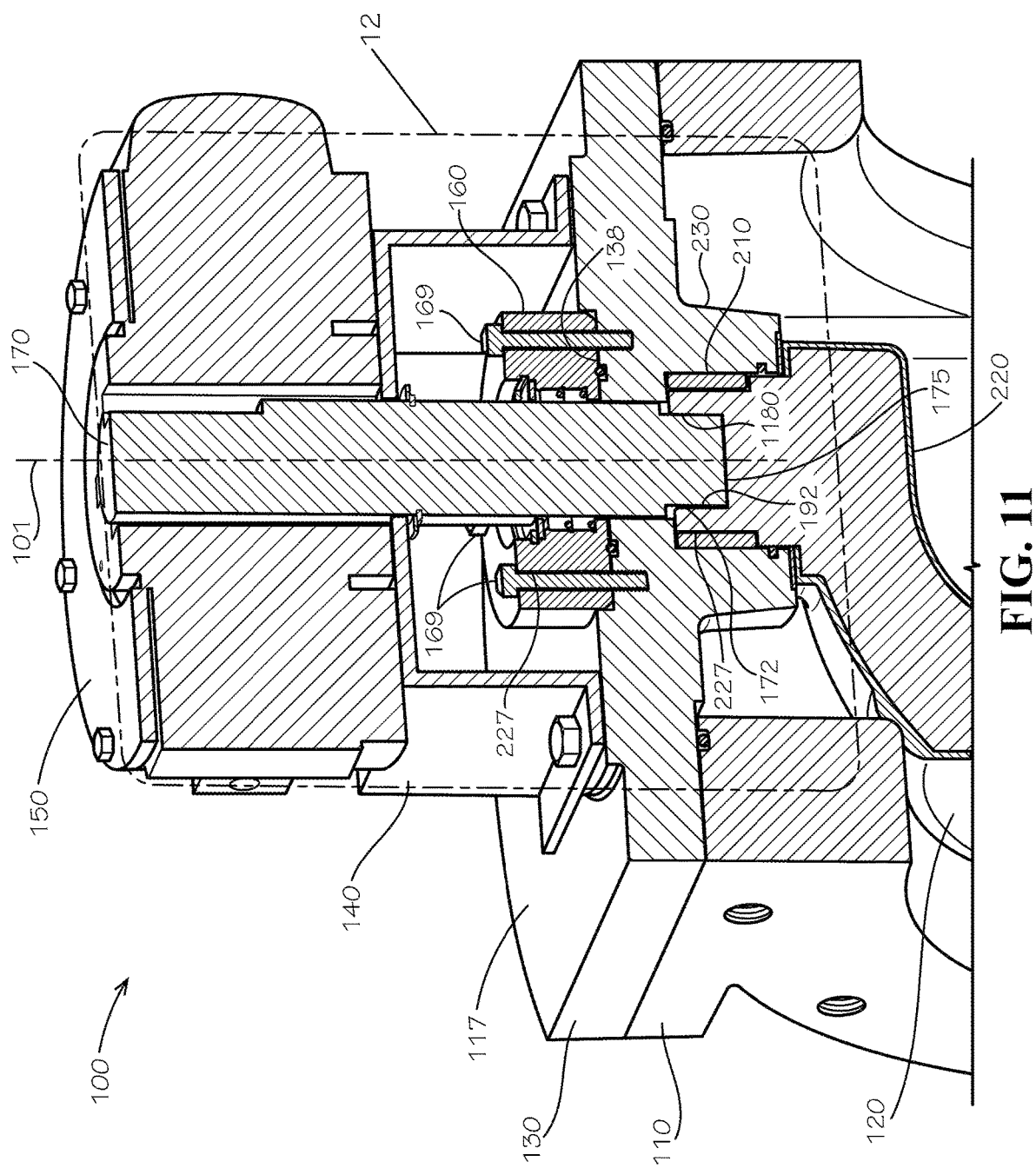
FIG. 11 is a sectional perspective view of the valve of FIG. 10 taken along line 11-11 of FIG. 10.

FIG. 11 is a sectional perspective view of the valve 100 of FIG. 10 taken along line 11-11 of FIG. 10. In some aspects, as shown, the valve member 120 and, more specifically, a bearing shaft 227 thereof, can receive the valve stem 170. The bearing shaft 227 can extend from the web 220 of the valve member 120. An axis of the bearing shaft 227 can be aligned with the axis 101 of the valve 100. In some aspects, the bearing shaft 227 can be an extension of the valve stem 170. More specifically, the bearing shaft 227 can define at least a portion of the valve stem 170 and, more specifically, the second portion 274 thereof. The bearing shaft 227 can define a female end or recess 1180, which can receive a male first end or first end 175 of valve stem 170. Again, the valve stem 170 can be, at least in part, separable from the valve member 120 and movable with respect to the valve member 120 during removal or installation. As shown, the valve 100 need no stem coupling 190 (shown in FIG. 1) when the valve stem 170 is coupled directly to the valve member 120.

One of the valve stem 170 and the recess 1180 of the bearing shaft 227 of the valve member 120 can define the anti-rotation element 172, and another of the valve stem 170 and the stem coupling 190 can define a flattened mating surface, which can be the mating element 192. For example and without limitation, each of the anti-rotation element 172 and the mating element 192 can be flat-machined on one or more portions of an axial end of the valve stem 170, as described above, or can be machined or otherwise defined in the valve member 120 and, more specifically, the bearing shaft 227. In some aspects, as shown, the mating element 192 can be defined on an inner surface of the bearing shaft 227 or, more specifically, the recess 1180 defined therein. In other aspects, the mating element 192 can be defined in an outer surface, e.g., the bearing surface 221, of the bearing shaft 227, which can otherwise be cylindrical. By defining the mating element 192 in the recess 1180, a greater portion or even an entirety of the bearing surface 221 of the bearing shaft 227 can, without interruption, remain cylindrical. Again, the bearing surface 221 of the valve member 120—and, more generally, the bearing shaft 227—can be received within the sleeve bearing 210. Again, the device body 260 and, more generally, the stem sealing device 160 can be positioned within the recess 138 defined in the top end 117 end of the valve body 110.

Figure 12:
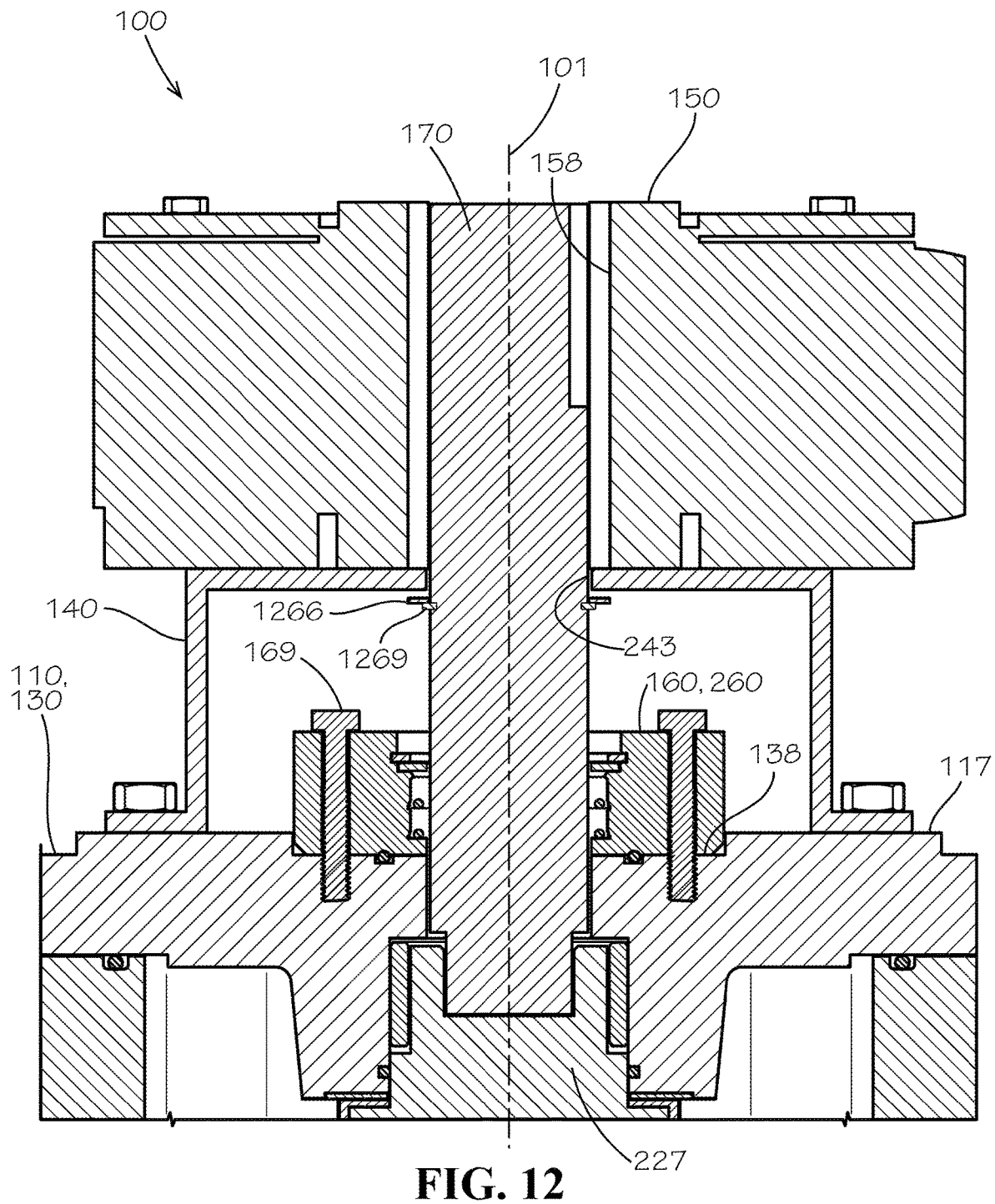
FIG. 12 is a detail sectional view of the valve of FIG. 10 taken from detail 12 of FIG. 11.

FIG. 12 is a detail sectional view of the valve 100 of FIG. 10 taken from detail 12 of FIG. 11. Unintended removal or ejection of the valve stem 170 can be prevented by securing one or more fastening elements thereto. Such ejection is contemplated because the valve stem 170 is exposed to water pressure inside the valve 100 that can tend to push the valve stem 170 from the valve body 110. In some aspects, as shown, a retainer 1269 can be received within an annular groove defined in a portion of the valve stem 170 extending between the valve member 120 and the riser 140. In some aspects, the retainer 1269 can define a gap between two circumferential ends thereof such that the retainer 1269 is a split ring or is C-shaped. More specifically, the retainer 1269 can be or can comprise a retaining ring and can be removable with snap ring pliers (not shown). In some aspects, a washer 1266 can be positioned about the valve stem 170 between the retainer 1269 and the riser 140 and/or actuator 150. An outer diameter of at least one of the washer 1266, which can be an anti-friction washer (e.g., comprising polytetrafluoroethylene or PTFE), and the retainer 1269 can be greater than an inner diameter of one of the second opening 243 in the riser 140 and/or the bore 158 of the actuator 150, which can be configured to receive the valve stem 170. Each of the washer 1266 and the retainer 269 can be formed from a rigid material configured to resist deformation under operational loads.

Figure 13A:
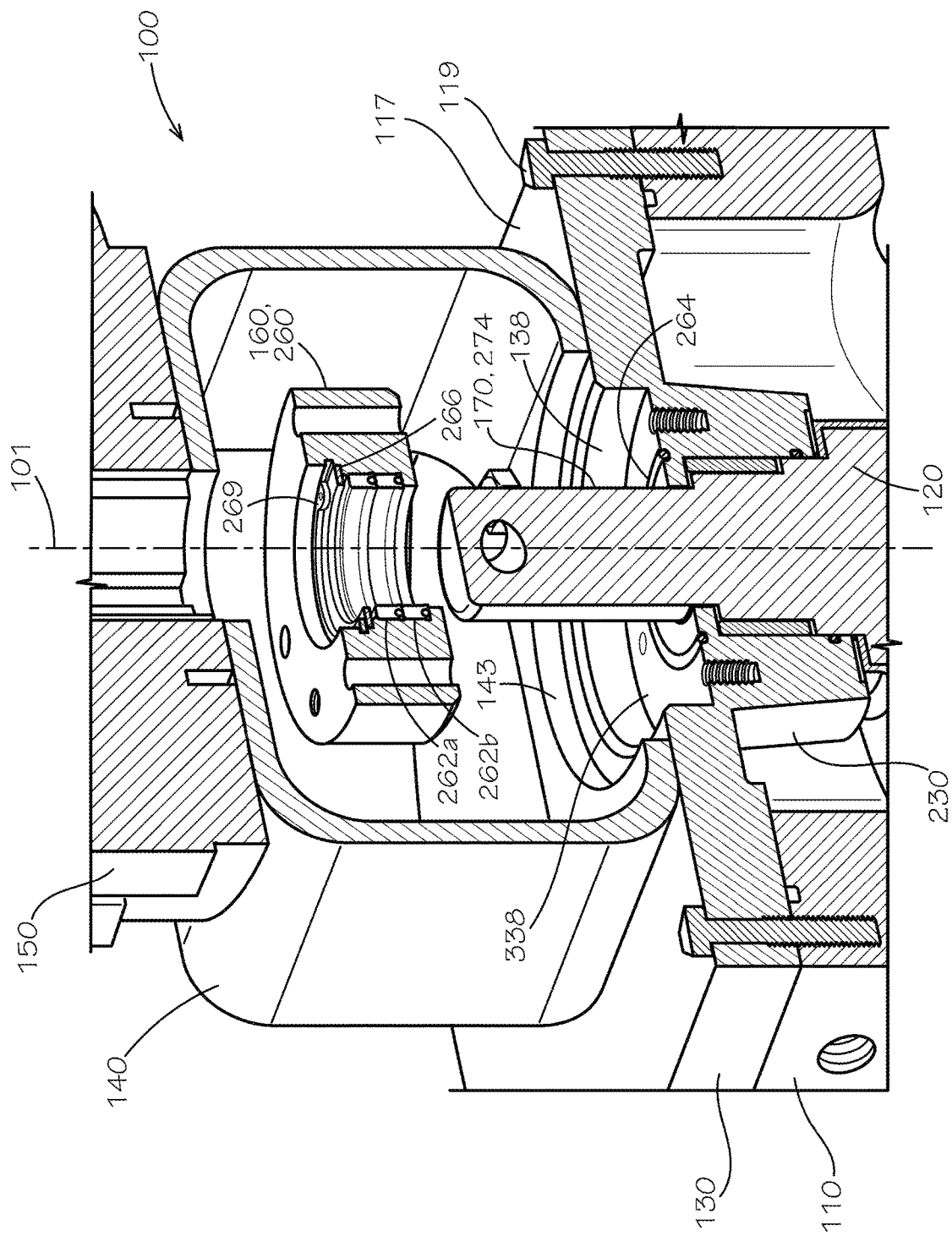
FIG. 13A is an exploded sectional perspective view of the valve of FIG. 12 showing the valve shown in FIG. 12.

FIG. 13A is an exploded sectional perspective view of the valve 100 of FIG. 12 showing the stem sealing device 160 shown in FIG. 12. Again, the stem sealing device 160 can be a self-contained cartridge able to be removed from or assembled to the valve 100 as an assembly, including as shown, during servicing.

Figure 13B:
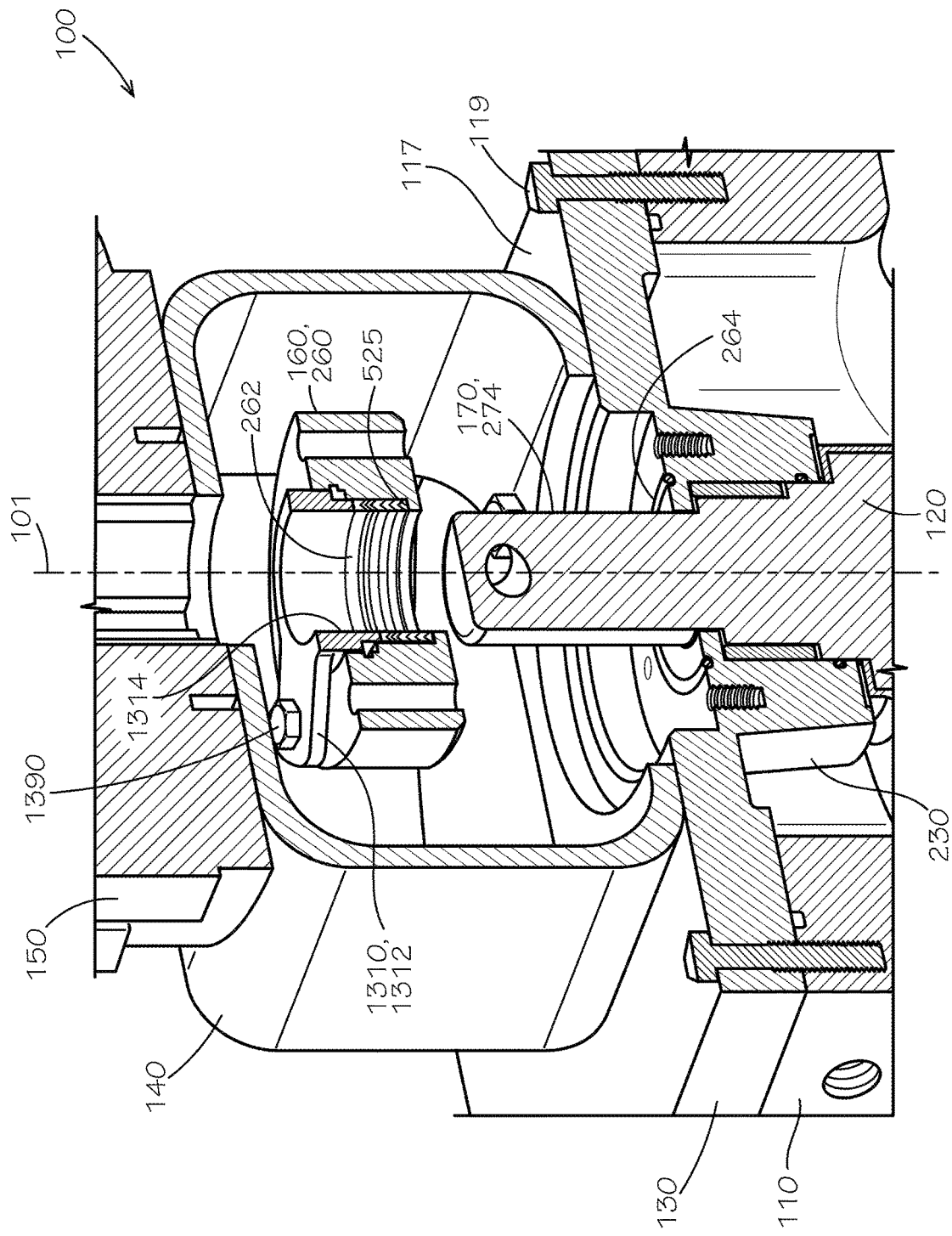
FIG. 13B is an exploded sectional perspective view of the valve of FIG. 12 showing the valve shown in FIG. 12 in accordance with another aspect of the current disclosure.

FIG. 13B is an exploded sectional perspective view of the valve 100 of FIG. 12 showing the stem sealing device 160 shown in FIG. 12 in accordance with another aspect of the current disclosure. As shown, the one or more fasteners 1390 (only one fastener 1390 shown in the instant cutaway view, but in some aspects another fastener 1390 can be positioned opposite the fastener 1390 shown) can secure the gland 1310, which can be or can comprise the washer 266. The gland 1310 can comprise a mounting portion 1312 and a seal contact portion 1314. In some aspects, an outer diameter of the seal contact portion 1314 can be larger than an outer diameter of the mounting portion 1312. In some aspects, as shown, the outer diameter of the seal contact portion 1314 can be smaller than the outer diameter of the mounting portion 1312. The gland 1310 can adjustably contact and press the stem seal 262. More specifically, the gland 1310 can increase the pressure on the stem seal 262 by tightening the one or more fasteners 1390 and thereby moving the gland 1310 closer to the stem seal 262. The stem seal 262 can be the V-type packing such as shown in FIG. 6B and can comprise as many third bodies 630 (shown in FIG. 6B) as needed to fill a space between the shoulder 525 and the gland 1310.

Figure 13C:
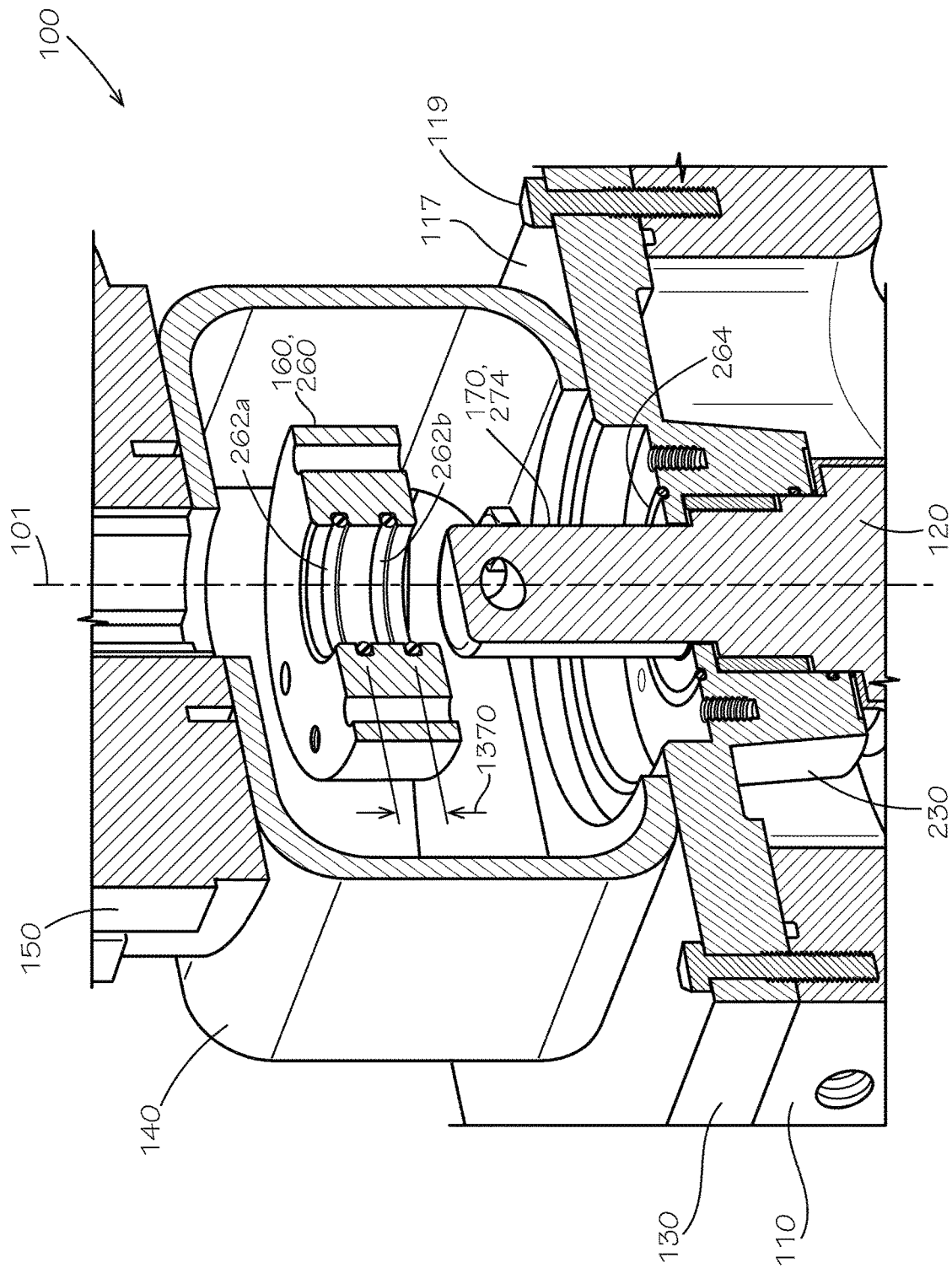
FIG. 13C is an exploded sectional perspective view of the valve of FIG. 12 showing the valve shown in FIG. 12 in accordance with another aspect of the current disclosure.

FIG. 13C is an exploded sectional perspective view of the valve 100 of FIG. 12 showing the stem sealing device 160 shown in FIG. 12 in accordance with another aspect of the current disclosure. As shown, each of the stem seals 262a,b can comprise only an O-ring, each of which can be monolithic. More specifically, the stem seals 262a,b can be spaced apart by a seal spacing 1370, which can be greater than a diameter of either stem seal 262a,b. As shown, each of the stem seals 262a,b can define the same diameter. In some aspects, the seal spacing 1370 can be at least twice the diameter of either stem seal 262a,b. In some aspects, the seal spacing 1370 can be at least twice the diameter of either stem seal 262a,b.

Figure 14:
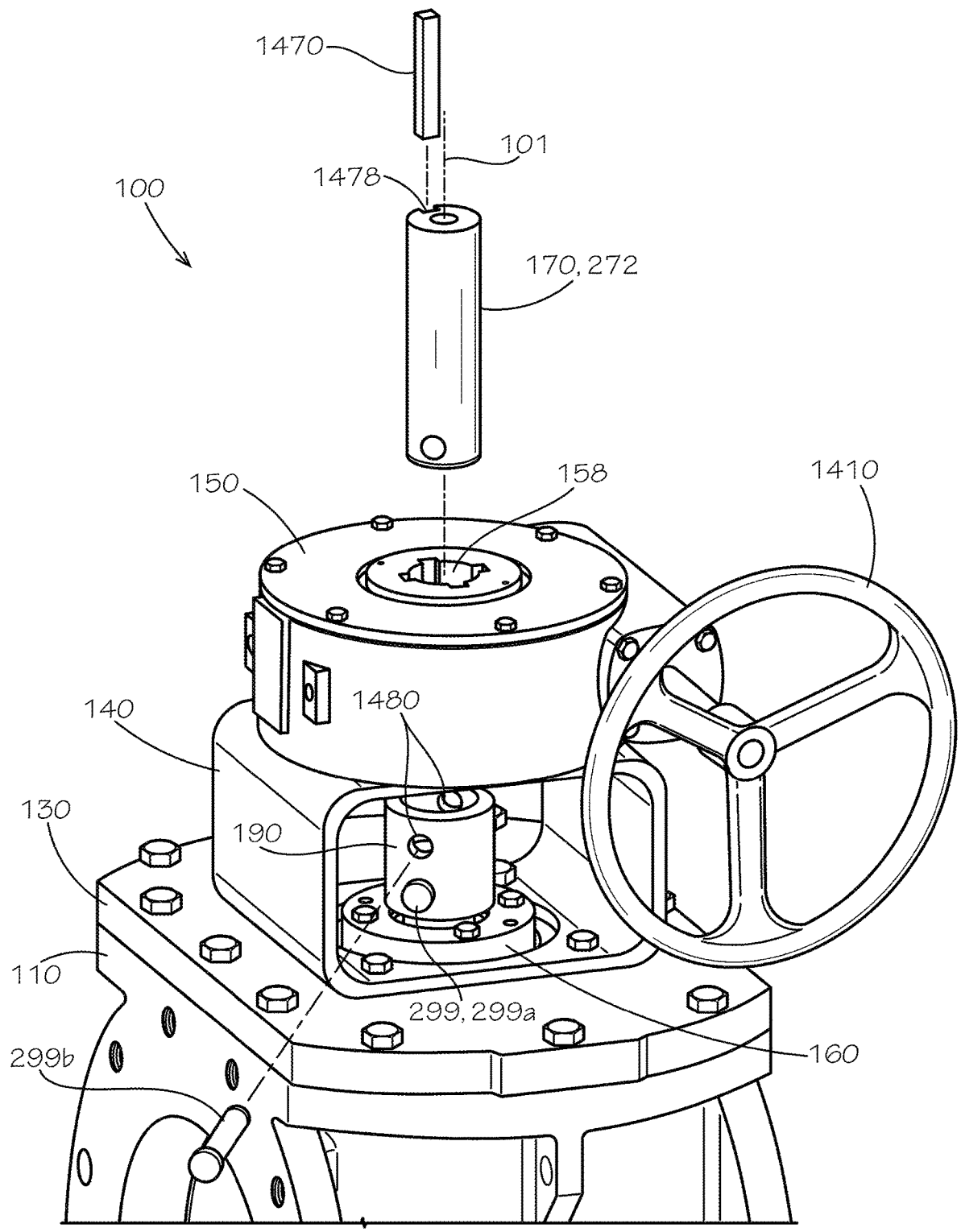
FIG. 14 is an exploded perspective view of the valve of FIG. 1 showing one step in disassembly and assembly of a seal of the valve.

FIG. 14 is an exploded perspective view of the valve 100 of FIG. 1 showing one step in disassembly and assembly—or removal and installation—of the stem sealing device 160 of the valve 100 from or to the valve body 110. In some aspects, as shown, the fastener 299 or the fasteners 299a,b can be received within and also extend completely through bores 1480 defined in the valve stem 170 and, where present, the stem coupling 190. In some aspects, any of the fastener 299 or the fasteners 299a,b can be a pin such as, for example and without limitation, a clevis pin as shown. The fastener 299 can comprise a cotter pin (not shown), which can extend through a hole defined in the clevis pin to lockably engage the clevis pin to the stem coupling 190. As shown, at least a portion of the valve stem 170 and, more specifically, the first portion 272 can be removable from the valve 100. The valve 100 can comprise a key 1470, which can be received within a groove 1478 defined in the valve stem 170 and can fix a rotational position of the valve stem 170 with respect to the actuator 150 or at least that portion of the actuator 150 defining the bore 158.

A method of maintaining, repairing, or, more generally, using the valve 100 can comprise removing at least a portion of the valve stem 170 of the valve 100. More specifically, removing the valve stem 170 can comprise removing at least a portion of the valve stem 170 and, more specifically, the first portion 272 thereof along the axis 101. More specifically, the method can comprise loosening the fasteners 299 or 299a,b in the stem coupling 190. The method can comprise lifting up the first portion 272 of the valve stem 170 so that the first portion 272 no longer occupies the space under the riser 140. The method can comprise exposing the top of one of the second portion 274 (shown in FIG. 15) and the plug stem or bearing shaft 227 (shown in FIG. 11).

Figure 15:
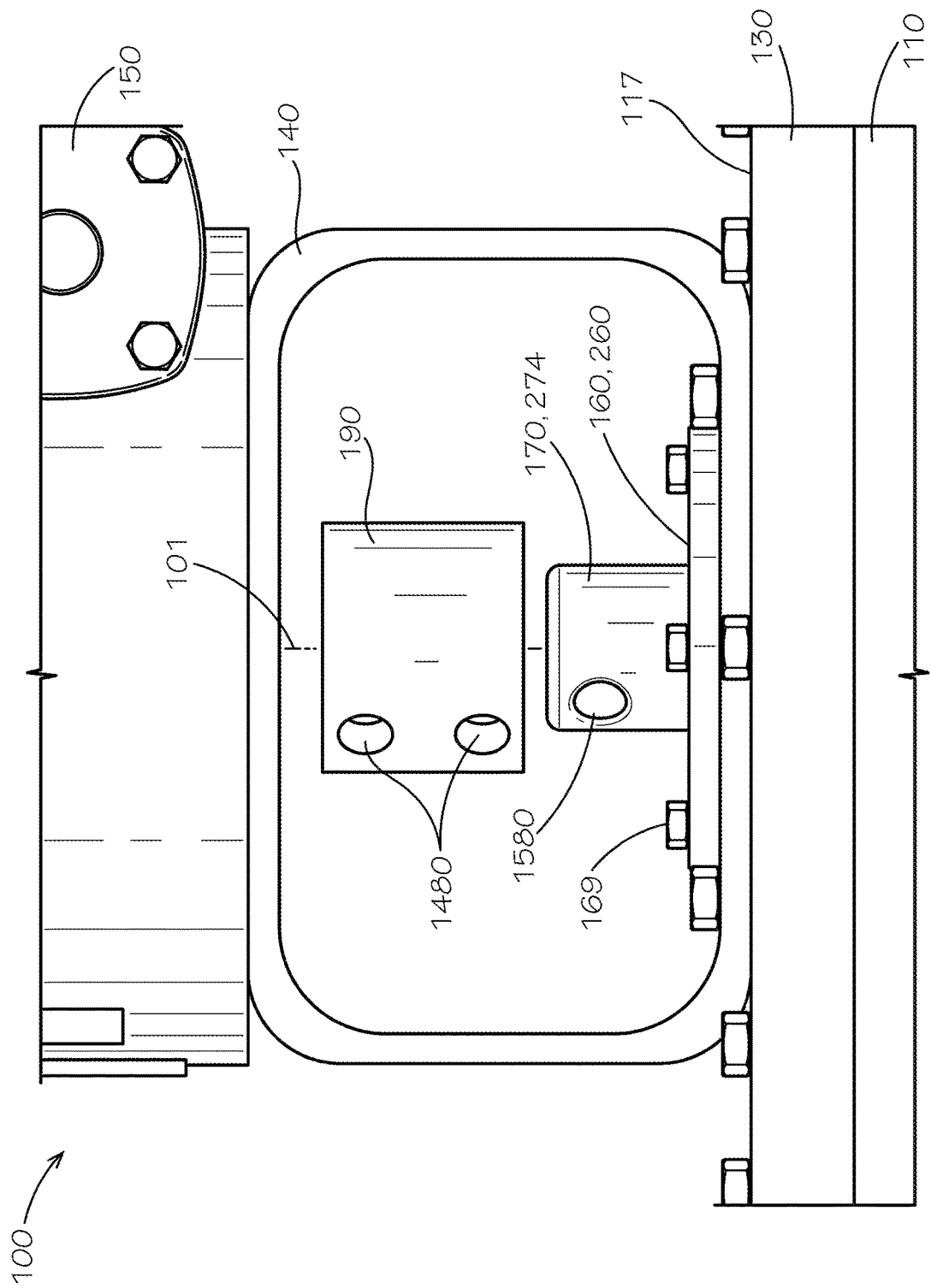
FIG. 15 is an exploded front view of the valve of FIG. 1 showing another step in the disassembly and assembly of the seal of the valve.

FIG. 15 is an exploded front view of the valve 100 of FIG. 1 showing another step in disassembly and assembly—or removal and installation—of the stem sealing device 160. Again, the stem coupling 190 can join each of the first portion 272 (shown in FIG. 14) and the second portion 274 of the valve stem 170. The stem coupling 190 and a surrounding portion of the valve 100 is shown with the fasteners 299 removed and the bores 1480 and a bore 1580 defined in the second portion 274 of the valve stem 170 now visible. The method of using the valve 100 can further comprise removing the stem coupling 190 of the valve 100. More specifically, the method can comprise removing the stem coupling 190 along the axis 101.

Figure 16:
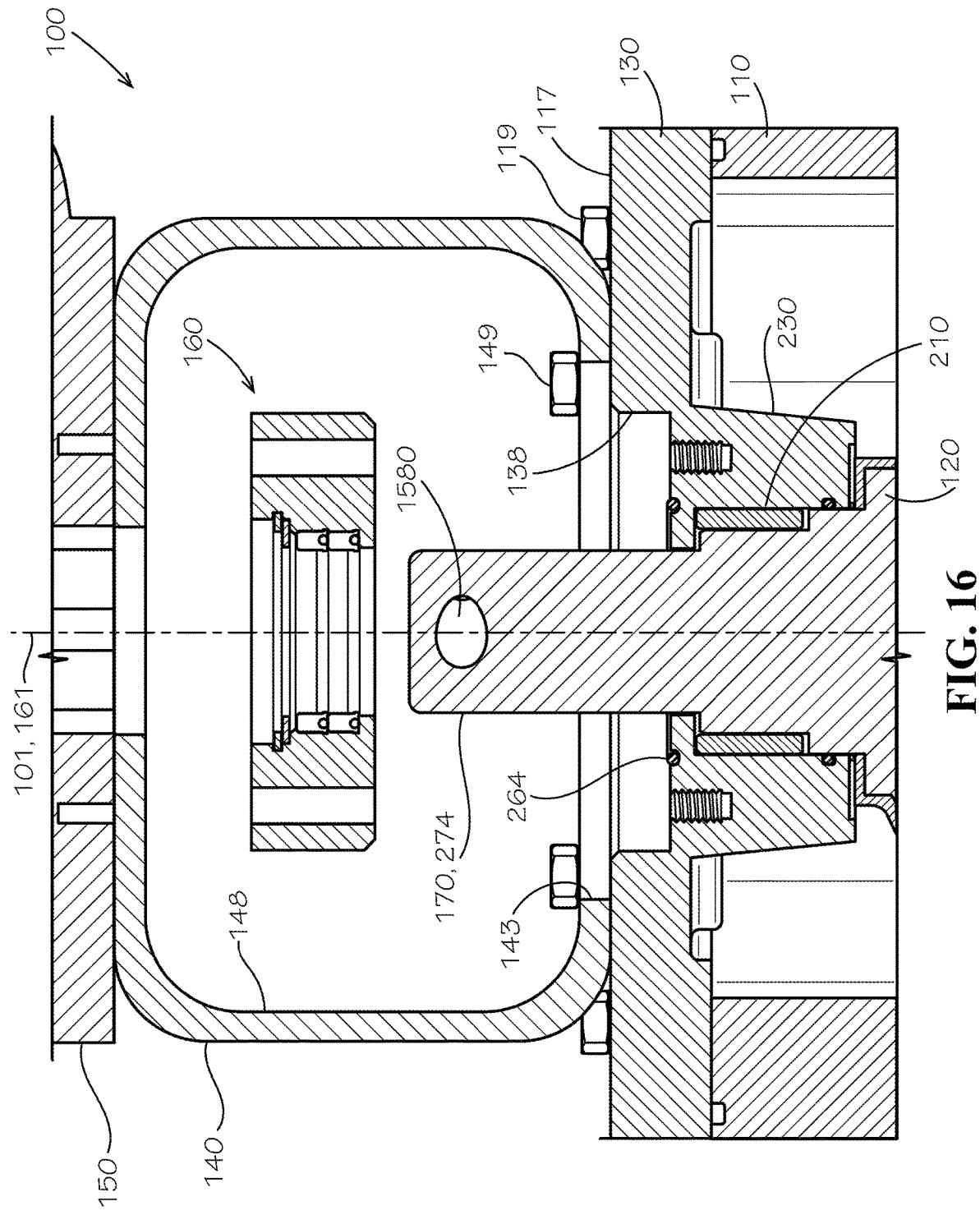
FIG. 16 is an exploded sectional front view of the valve of FIG. 1 showing yet another step in the disassembly and assembly of the seal of the valve.

FIG. 16 is an exploded sectional front view of the valve 100 of FIG. 1 showing yet another step in disassembly and assembly—or removal and installation—of the stem sealing device 160. The method can comprise removing the stem sealing device 160 of the valve 100 and, more specifically, removing the stem sealing device 160 along the axis 101. More specifically, with the one of the second portion 274 and the bearing shaft 227 (shown in FIG. 11) exposed, the method can comprise installing or removing a sealing solution such as the stem sealing device 160 over the top of the valve stem 170 without removing the actuator 150.

The method can comprise providing clearance for removal of the stem sealing device 160 without cutting any portion of the stem sealing device 160. More specifically, the method can comprise providing clearance for the stem sealing device 160 without cutting any stem seals 262. In some aspects, the method of providing clearance for the stem sealing device 160 can comprise positioning the riser 140 between the valve body 110 and the actuator 150. In some aspects, the method of providing clearance for the stem sealing device 160 can comprise temporarily disassembling and moving the actuator 150 to a position offset from the valve body, in which case a surface of the actuator 150 in contact with the valve body 150 during operation of the valve 100 can be temporarily offset by an offset distance (not shown) of 2 inches or less. In some aspects, the same surface of the actuator 150 can be temporarily offset by an offset distance (not shown) equal to an axial height of the stem sealing device 160 and an additional distance, if any, required for the stem sealing device 160 do be fully removable.

The method can comprise removing the stem sealing device 160 without cutting any portion of the stem sealing device 160 or, more specifically, the stem seals 262. In some aspects, the method can comprise removing the stem sealing device 160 from or installing the stem sealing device 160 in the valve 100 without prior or subsequent removal of the one or more stem seals 262 from the stem sealing device 160. The method can comprise removing the one or more fasteners 169 (shown in FIG. 14). The method can comprise lifting the stem sealing device 160 up and over the second portion 274. The method can comprise listing the stem sealing device 160 out from under the riser 140. Each step of the method can be completed within the space that the riser 140 creates, i.e., through the one or more access openings 148 such that the actuator 150 need not be removed.

The method can comprise providing clearance for a replacement stem sealing device 160 without cutting any portion of the replacement stem sealing device 160. The method can comprise installing the replacement stem sealing device 160 without cutting any portion of the replacement stem sealing device 160. More specifically, the method can comprise providing clearance for the replacement stem sealing device 160 without cutting any stem seals 262. The method can comprise adjusting the stem sealing device 160—original or replacement—by tightening or loosening a fastener such as, for example and without limitation, the fastener 1390 (shown in FIG. 13B) to adjust a degree of sealing between the valve body 110 and the valve stem 170.

In some aspects, the valve body 110 can be cast from any one or more of a number of different metals or metal alloys including, for example and without limitation, stainless steel, carbon steel, cast iron, ductile iron, and various steel and non-steel alloys including INCOLLOY alloys, MONEL alloys, HASTELLOY alloys, INCONEL alloys, and chrome moly alloys. The valve body 110 can also be machined. In other aspects, any component of the valve 100 such as, for example and without limitation, the valve body 110 can be formed using an additive manufacturing method such as used in a three-dimensional printing process.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve comprising:
a valve body;
a valve member positioned inside the valve body and configured to selectively open and close the valve upon rotation of the valve member;
a valve stem extending from the valve body, at least a portion of the valve stem coupled to the valve member, separable from the valve member, and movable with respect to the valve member during removal or installation to create a gap between the valve stem and the valve member;
a stem sealing device secured to the valve body and encircling the valve stem, the stem sealing device defining an annular shape and configured to seal a gap between the valve stem and the valve body; and
a valve riser secured to the valve body and allowing access to the stem sealing device and replacement of the stem sealing device without displacement of the valve riser or an actuator secured thereto and without cutting of a seal stem of the stem sealing device, the actuator configured to rotate the valve member.

2. The valve of claim 1, wherein the valve stem comprises a first portion and a second portion, the first portion distal from the valve member and coupled to the second portion and the second portion proximate to the valve member and extending from the valve member.

3. The valve of claim 2, wherein a connection between the first portion and the second portion is positioned axially between the stem sealing device and the valve member with respect to an axis of the stem.

4. The valve of claim 2, wherein the first portion and the second portion are coupled to each other with a stem coupling.

5. The valve of claim 4, wherein the stem coupling is joined to each of the first portion and the second portion with a fastener.

6. The valve of claim 5, wherein the fastener is a pin.

7. The valve of claim 4, wherein the stem coupling defines an annular shape.

8. The valve of claim 1, wherein the valve riser defines a constant shape in cross-section except for any openings or seams defined therein.

9. The valve of claim 1, wherein the valve is one of a plug valve, a cone valve, and a butterfly valve.

10. The valve of claim 9, wherein the valve is the plug valve.

11. The valve of claim 9, wherein the valve is the cone valve.

12. The valve of claim 9, wherein the valve is the butterfly valve.

13. The valve of claim 1, wherein a washer is positioned axially adjacent to a stem seal of the stem sealing device and distal from the valve member, the washer configured to maintain a position of the stem seal inside a bore of a device body of the stem sealing device.

14. The valve of claim 1, wherein the stem sealing device comprises a device body.

15. The valve of claim 14, wherein the device body is positioned within a recess defined in an end of the valve body.

16. The valve of claim 14, wherein the device body is secured to the valve body with a plurality of fasteners.

17. The valve of claim 14, wherein the device body is secured to the valve body with a gland, the gland comprising a mounting portion and a seal contact portion, the seal contact portion being angled with respect to at least a portion of the mounting portion.

18. The valve of claim 14, wherein the device body defines a minor diameter and a major diameter, the major diameter being larger than the minor diameter, the device body defining a shoulder defining the minor diameter.

19. The valve of claim 14, wherein the device body comprises a first portion defining a first outer diameter and a second portion extending from the first portion, the second portion defining a second outer diameter, the second outer diameter being less than the first outer diameter.

20. The valve of claim 19, wherein the device body further comprises a third portion extending from the second portion, the third portion defining a third outer diameter, the third outer diameter being less than the second outer diameter.

21. The valve of claim 1, wherein the valve stem defines an anti-rotation element configured to prevent rotation of the valve stem with respect to an adjoining component of the valve.

22. The valve of claim 1, wherein the anti-rotation element is a flattened surface on the valve stem.

23. The valve of claim 1, wherein the valve riser defines an access opening, the access opening allowing access to the stem sealing device and replacement of the stem sealing device without displacement of the valve riser or the actuator.

24. The valve of claim 1, wherein the valve riser is formed from a length of tubing.

25. The valve of claim 24, wherein the tubing is rectangular tubing.

26. The valve of claim 1, wherein the valve riser comprises:
a base panel;
a top panel; and
a side panel joining the base panel and the top panel.

27. The valve of claim 1, wherein the stem sealing device comprises one of a U-cup packing, a V-style packing, and an 0-ring.

28. The valve of claim 1, wherein the washer is retained in the stem sealing device with a retainer.

29. A stem sealing device for a valve, the stem sealing device comprising:
a device body defining an annular shape;
a stem seal defining an annular shape and configured to seal a gap between a valve stem of the valve and a valve body of the valve and positioned within the device body, the stem sealing device installable in and removable from the valve as an assembly without prior or subsequent removal of the stem seal; and
a fastener configured to secure the device body to the valve body.

30. The stem sealing device of claim 29, wherein the stem seal comprises one of a U-cup packing, a V-style packing, and an O-ring.

31. The stem sealing device of claim 29, further comprising a body seal configured to seal a gap between the device body and the valve body.

32. The stem sealing device of claim 29, wherein the device body comprises a first body portion and a second body portion, the second body portion separably joined to the first body portion.

33. The stem sealing device of claim 29, wherein the device body comprises a first portion defining a first outer diameter and a second portion extending from the first portion, the second portion defining a second outer diameter, the second outer diameter being less than the first outer diameter.

34. The stem sealing device of claim 33, wherein the device body further comprises a third portion extending from the second portion, the third portion defining a third outer diameter, the third outer diameter being less than the second outer diameter.

35. The stem sealing device of claim 29, wherein the stem seal comprises a V-style packing.

36. The stem sealing device of claim 29, further comprising a body seal configured to seal a gap between the device body and the valve body.

37. The stem sealing device of claim 29, wherein a washer is positioned axially adjacent to the stem seal, the washer configured to maintain a position of the stem seal inside a bore of the device body.

38. A method of replacing a stem seal of a valve, the method comprising:
removing at least a portion of a valve stem of the valve; and
removing a stem sealing device of the valve; the stem sealing device comprising
a device body defining an annular shape;
a stem seal defining an annular shape and configured to seal a gap between a valve stem of the valve and a valve body of the valve and positioned within the device body, the stem sealing device installable in and removable from the valve without prior or subsequent removal of the stem seal; and
a fastener securing the device body to the valve body.

39. The method of claim 38, wherein the valve stem comprises a first portion and a second portion, the first portion distal from a valve member of the valve and coupled to the second portion and the second portion proximate to the valve member and coupled to the valve member, the method further comprising removing a stem coupling of the valve, the stem coupling joining each of the first portion and the second portion with a fastener.

40. The method of claim 38, further comprising adjusting the stem sealing device by tightening the plurality of fasteners.

41. The method of claim 38, wherein the valve stem comprises a first portion and a second portion, the first portion distal from a valve member of the valve and coupled to the second portion and the second portion proximate to the valve member and coupled to the valve member, wherein removing at least a portion of a valve stem of the valve comprises removing the first portion.

42. The method of claim 41, wherein removing the first portion comprises providing clearance for a replacement stem sealing device without cutting any portion of the replacement stem sealing device.

43. The method of claim 38, further comprising installing a replacement stem sealing device without cutting any portion of the replacement stem sealing device.

44. The method of claim 38, further comprising adjusting the stem sealing device by tightening a fastener configured to secure the stem sealing device to the valve body.

\* \* \* \* \*